(12) United States Patent
Nishibashi et al.

(10) Patent No.: US 7,386,408 B2
(45) Date of Patent: Jun. 10, 2008

(54) PARALLEL KINEMATIC MACHINE, CALIBRATION METHOD OF PARALLEL KINEMATIC MACHINE, AND CALIBRATION PROGRAM PRODUCT

(75) Inventors: Nobutaka Nishibashi, Sakai (JP); Kazuaki Yagi, Sakai (JP)

(73) Assignee: Shinn Nippon Koki Co., Ltd.

( * ) Notice: Subject to any disclaimer, the term of this patent is extended or adjusted under 35 U.S.C. 154(b) by 0 days.

(21) Appl. No.: 11/526,488

(22) Filed: Sep. 25, 2006

(65) Prior Publication Data

US 2007/0138374 A1 Jun. 21, 2007

(30) Foreign Application Priority Data

Oct. 17, 2005 (JP) ............................ 2005-302105
Nov. 7, 2005 (JP) ............................ 2005-322294

(51) Int. Cl.
*G01B 5/03* (2006.01)

(52) U.S. Cl. ............................ 702/94; 702/91; 702/33; 702/44; 702/85; 702/15; 702/103; 33/502; 33/548; 33/503; 33/556; 33/557; 33/549; 33/551; 73/1.19; 700/245; 700/551; 901/14; 901/15; 901/16; 901/17; 901/18

(58) Field of Classification Search ............... 702/94, 702/91, 33, 44, 85, 105, 113; 250/208.1; 33/502
See application file for complete search history.

(56) References Cited

U.S. PATENT DOCUMENTS 6,587,802 B1 * 7/2003 Schroder et al. .............. 702/91

FOREIGN PATENT DOCUMENTS

JP 2002-91522 3/2002
JP 2003-200367 7/2003

* cited by examiner

*Primary Examiner*—John Barlow
*Assistant Examiner*—Sujoy Kundu
(74) *Attorney, Agent, or Firm*—Gerald E Hespos; Anthony J. Casella

(57) ABSTRACT

A parallel kinematic machine has a parallel kinematic mechanism including an end effecter and a parallel link mechanism. A numerical control device controls a position and orientation of the end effecter based on kinematics of the parallel kinematic mechanism. A posture setter sets an adjustment tool on the end effecter in a known posture in a reference coordinate system defined outside the parallel kinematic mechanism based on a measurement method. A data acquirer acquires data in accordance with a measurement method selecting code for designating the measurement method used by the posture setter in setting the adjustment tool in the known posture, and defines a correlation between kinematic parameters for the parallel kinematic mechanism and the reference coordinate system. A calculator calculates the kinematic parameters based on the acquired data by using a relational expression describing forward kinematics of the parallel kinematic mechanism.

16 Claims, 13 Drawing Sheets

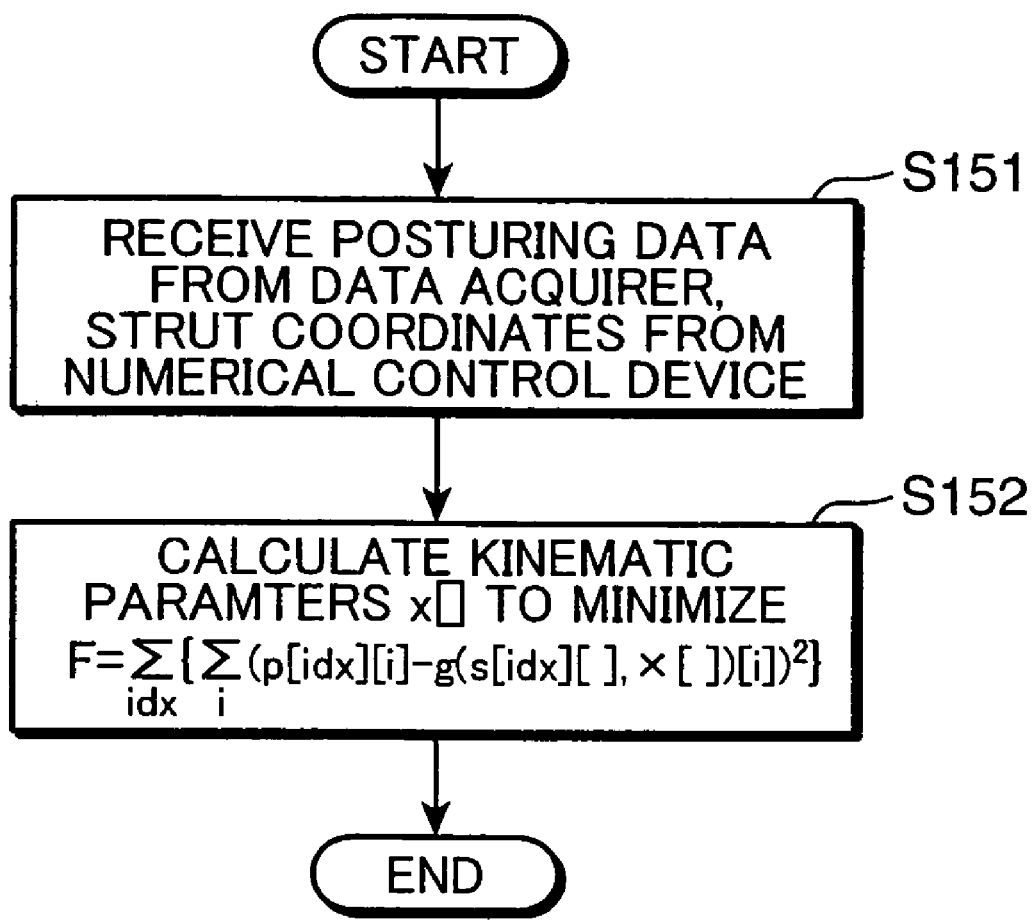

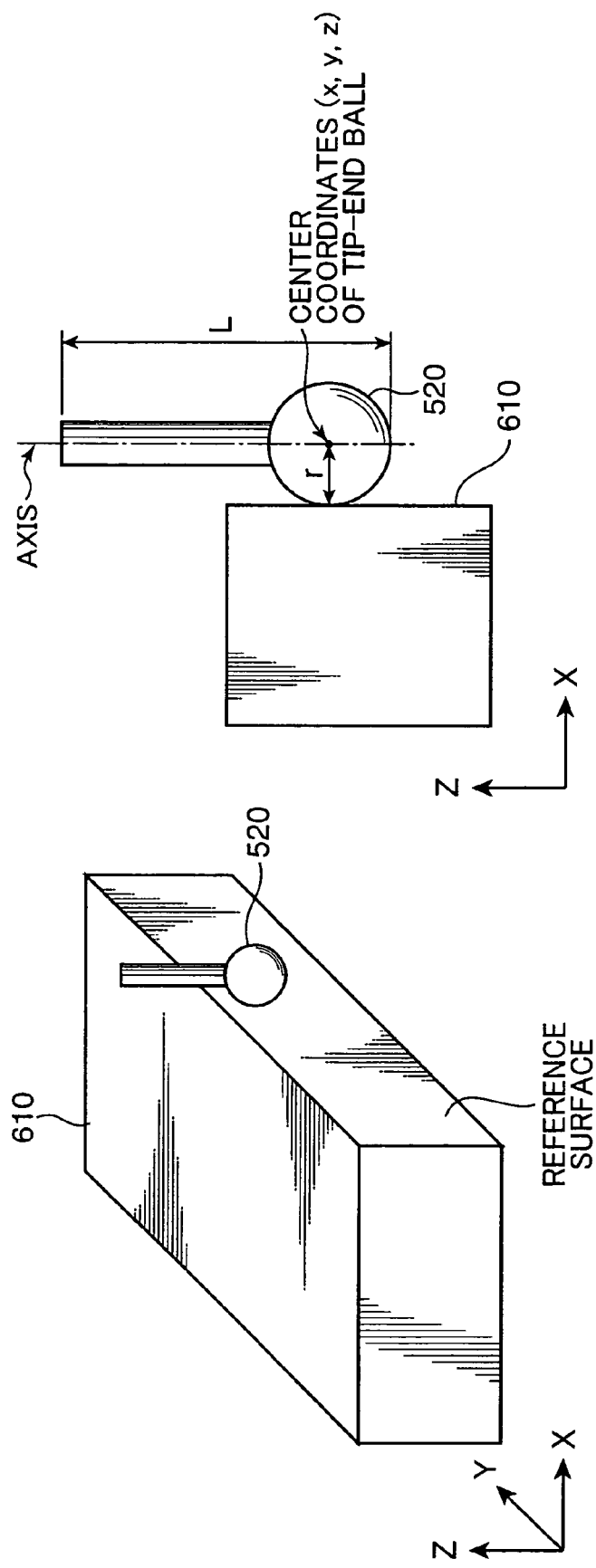

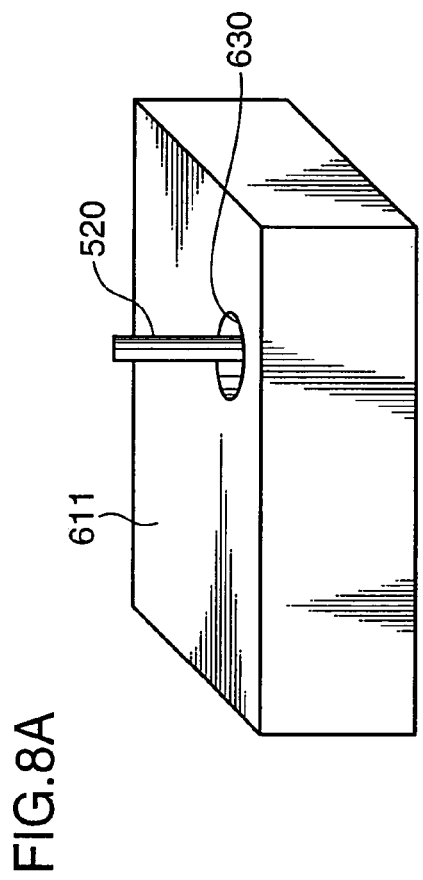
FIG.8A
FIG.8B
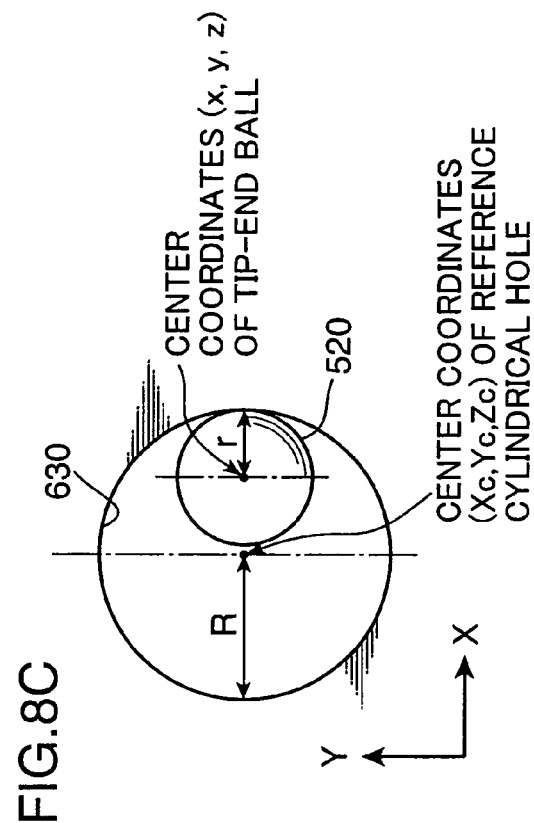
FIG.8C

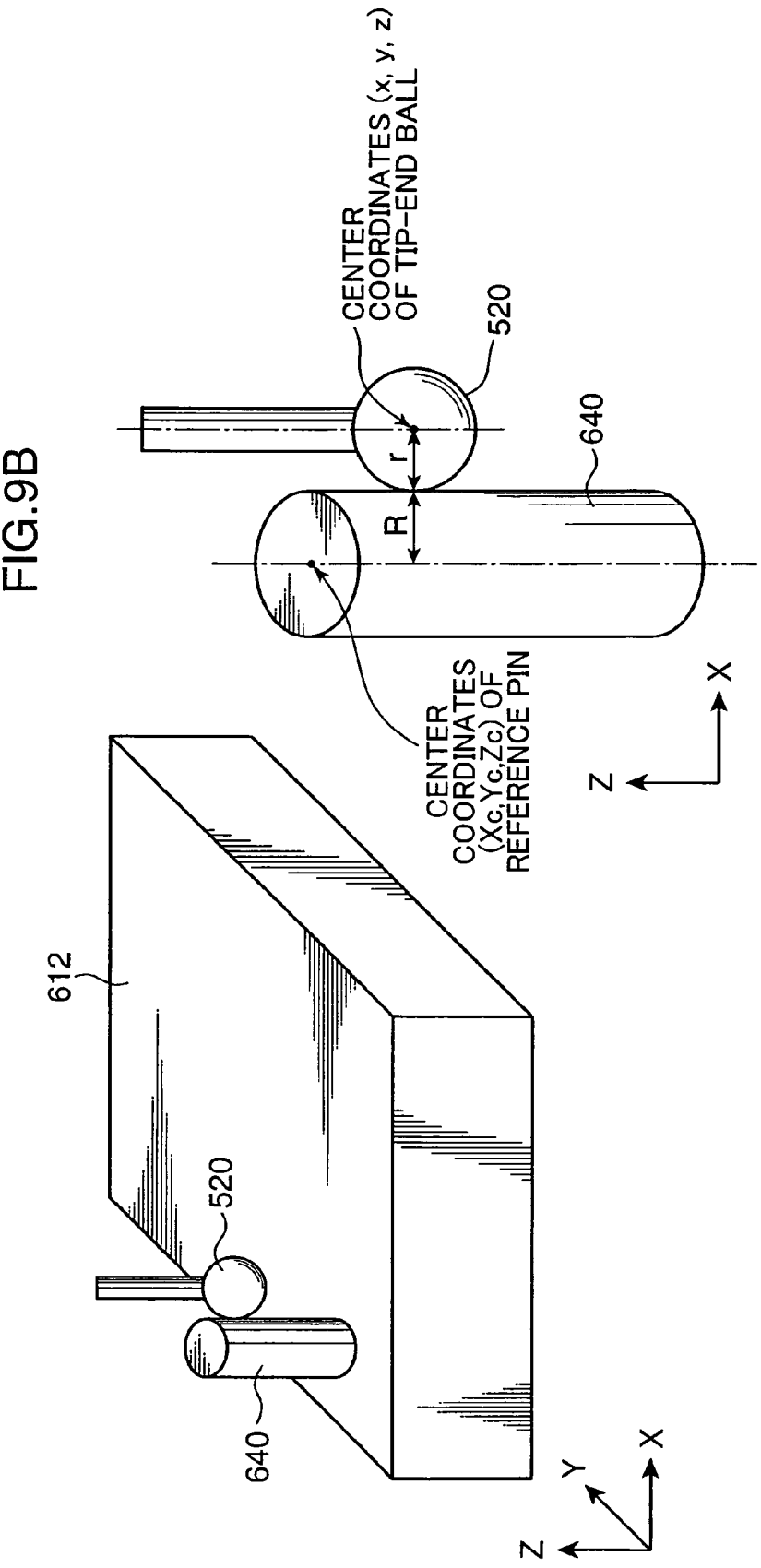

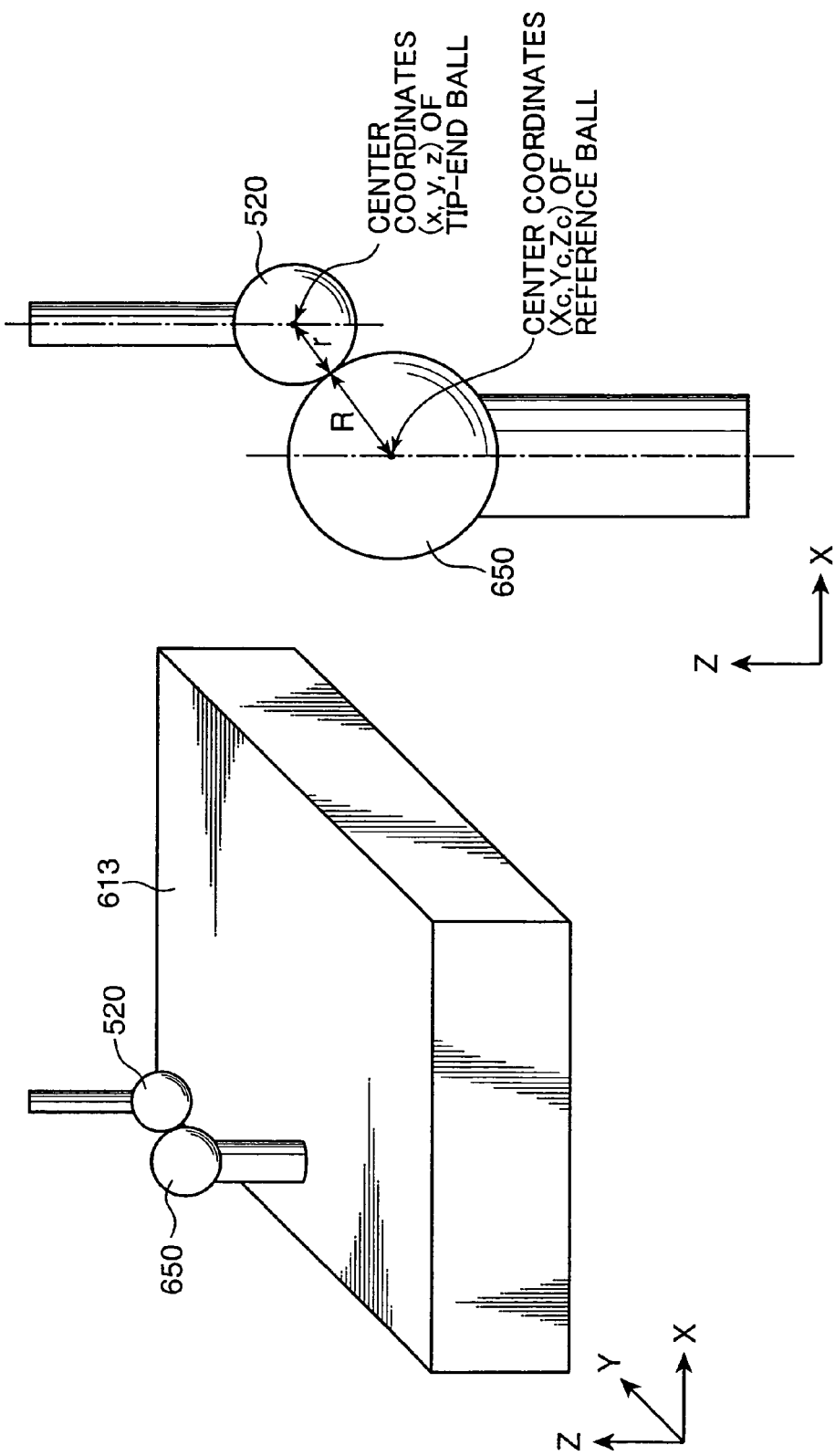

PARALLEL KINEMATIC MACHINE, CALIBRATION METHOD OF PARALLEL KINEMATIC MACHINE, AND CALIBRATION PROGRAM PRODUCT

BACKGROUND OF THE INVENTION

1. Field of the Invention

The present invention relates to a parallel kinematic machine, and a calibration technology of identifying kinematic parameters in the parallel kinematic machine.

2. Description of the Related Art

A parallel kinematic mechanism which is provided with a base and an end effecter connected parallel to each other by plural driver shafts has higher rigidity and accuracy in posturing than a mechanism which is provided with a cantilever. The Stewart platform is a typical example of the parallel kinematic mechanisms. The Stewart platform has straight driver shafts or struts which are expanded or contracted to control the posture including a position and an orientation of an end effecter. For the highly accurate posturing, however, it is necessary to calculate accurate kinematic parameters such as the length of a strut, coordinates of a joint connecting a strut and a base, and a joint connecting a strut and the end effecter. This operation is known as parallel kinematic mechanism calibration, which is studied by various research institutes of the industry, the government, and the academy.

Generally, such calibration requires solution of multiple simultaneous equations whose number is the same as those of the parameters. To this end, it is necessary to place the end effecter in a determined position and a determined orientation, and determine all or a part of position coordinates (X, Y, Z) and orientation coordinates (A, B, C) in the determined state.

Japanese Unexamined Patent Publication No. 2002-91522 discloses a technology whereby the end effecter is moved in a circle in a given posture, and a radial error in the locus of the circular movement is measured by a range meter of a double ball bar (DBB) system, and kinematic parameters are then calculated based on thus-obtained measurement values in order to determine position coordinates and orientation coordinates. Also, Japanese Unexamined Patent Publication No. 2003-200367 discloses a technology that multiple simultaneous equations are separated into eleven or more equations showing relationships between the end effecter position and the kinematic parameters, and one equation showing a relationship between the end effecter orientation and the kinematic parameters, and these equations are solved to calculate kinematic parameters to execute calibration.

Both of the prior art documents, however, employ small scale kinematics to identify kinematic parameters. It is difficult to analytically solve kinematics problems, particularly, forward kinematics problems. The small scale kinematics, which is also called as differential kinematics or displacement kinematics, is one of the academic fields studying an arithmetic approach of solving these problems. In the small scale kinematics, nonlinear equations describing the forward kinematics are differentiated by the respective kinematic parameters to calculate linear expressions that satisfy relations between errors i.e. small scale displacements of kinematic parameters, and errors i.e. small scale displacements of position coordinates so as to analytically solve the linear expressions. In other words, the small scale kinematics deals with a mathematical expression between an error of a certain numerical value, and an error of another numerical value.

However, it can be seen that the former prior art document refers to the fact that at least one kinematic parameter cannot be acquired. Also, the technology of the latter prior art document requires measurement after posturing, and in particular requires at least one measurement in the posture that involves difficult measurement. Also, the small scale kinematics employed in both of the prior art documents has a difficulty in suppressing numerical errors concerning the relational expressions on small scale displacement. Accordingly, in the case where gravity deformation or a like factor is inevitably involved particularly in use of a large-sized machine tool, convergence in numerically identifying kinematic parameters is poor, which obstructs accurate identification of the kinematic parameters.

SUMMARY OF THE INVENTION

It is an object of the present invention to provide a novel calibration technology which is free from the problems residing in the prior art.

It is another object of the present invention to provide a parallel kinematic machine that enables to suppress numerical errors and accurately identify all the kinematic parameters with direct use of basic kinematics equations, as well as a calibration method and a calibration program product for calibrating such parallel kinematic machine.

According to an aspect of the invention, a parallel kinematic machine comprises: a parallel kinematic mechanism which includes a base supported on a support platform, an end effecter, and a parallel link mechanism having a plurality of driver shafts for holding the end effecter in the base; a numerical control device for controlling a position and an orientation of the end effecter by driving the driver shafts based on kinematics of the parallel kinematic mechanism; a posture setter for setting an adjustment tool attached to the end effecter in a known posture in a reference coordinate system defined outside of the parallel kinematic mechanism based on a predetermined measurement method, an axis of the end effecter and an axis of the adjustment tool being in agreement with each other; a data acquirer for acquiring data that has a form in accordance with a measurement method selecting code for designating the measurement method used by the posture setter in setting the adjustment tool in the known posture, and defines a correlation between kinematic parameters necessary for the kinematics of the parallel kinematic mechanism, and the reference coordinate system; and a calculator for calculating at least the kinematic parameters based on the acquired data by directly using a relational expression describing forward kinematics of the parallel kinematic mechanism.

These and other objects, features and advantages of the present invention will become more apparent upon reading of the following detailed description along with the accompanying drawings.

BRIEF DESCRIPTION OF THE DRAWINGS

FIG. 6 is a flowchart showing a flow of operations to execute a calibration according to the embodiment.

FIGS. 7A and 7B are illustrations for describing a data acquisition process in a second mode of the embodiment, wherein FIG. 7A shows a tip end of an adjustment tool and its vicinity in performing the data acquisition process, and FIG. 7B is a side view viewed from an Y-axis direction.

FIGS. 8A to 8C are illustrations for describing a data acquisition process in a third mode of the embodiment, wherein FIG. 8A shows a tip end of an adjustment tool and its vicinity in performing the data acquisition process, FIG. 7B is a cross-sectional view taken along a plane parallel to an X-axis, and FIG. 7C is a top plan view viewed from a Z-axis direction.

FIGS. 9A and 9B are illustrations for describing a data acquisition process in a modification of the third mode, wherein FIG. 9A shows a tip end of an adjustment tool and its vicinity in performing the data acquisition process, and FIG. 9B is an enlarged view of FIG. 9A.

FIGS. 10A and 10B are illustrations for describing a data acquisition process in a fourth mode of the embodiment, wherein FIG. 10A shows a tip end of an adjustment tool and its vicinity in performing the data acquisition process, and FIG. 10B is an enlarged view of FIG. 10A.

FIGS. 11A and 11B are illustrations for describing a data acquisition process in a fifth mode of the embodiment, wherein FIG. 11A shows a tip end of an adjustment tool and its vicinity in performing the data acquisition process, and FIG. 11B is an enlarged view of a DBB system.

FIGS. 13A to 13D are schematic diagrams showing a flat jig plate and a tilt jig plate, wherein FIG. 13A is an illustration of the flat jig plate viewed from an end effecter, FIG. 13B is a side view of FIG. 13A, FIG. 13C is an illustration of the tilt jig plate viewed from the end effecter, and FIG. 13D is a side view of FIG. 13C.

DETAILED DESCRIPTION OF THE PREFERRED EMBODIMENTS

Figure 1:
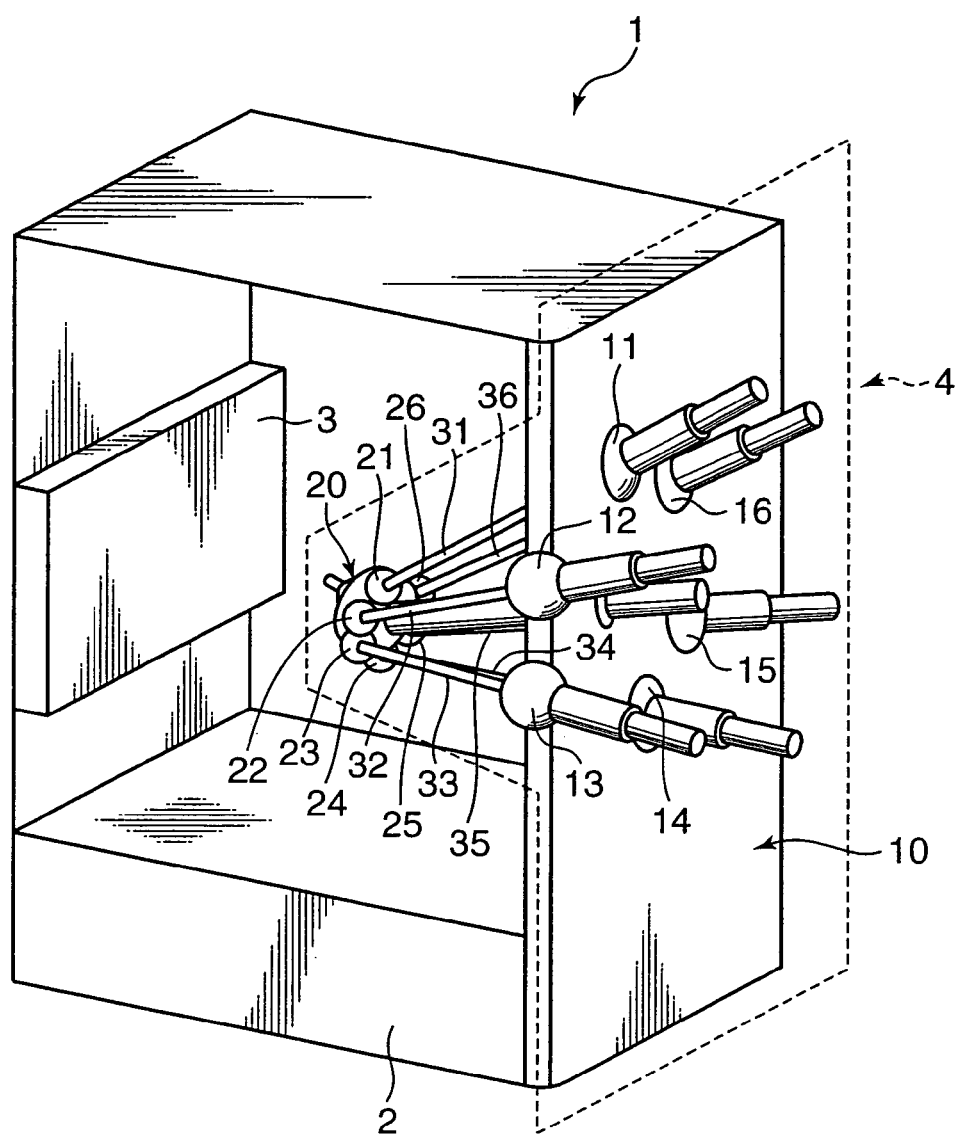
FIG. 1 is a perspective view showing a mechanical configuration of a parallel kinematic machine embodying the invention.

In the following, a preferred embodiment of the invention will be described with reference to the accompanying drawings. The embodiment will be described with reference to a 6×6 parallel kinematic machine, as an example of a parallel kinematic machine embodying the invention, which includes six joints on an end effecter and six joints on a base, more specifically, is in the form of the Stewart platform which has direct driving actuators, i.e., struts as driver shafts. It should be noted that, in the drawings, the elements or steps given with the same numerals or characters perform like operations, functions, and processings, and repeated description on the like operations, functions, and processings will be avoided herein.

Referring to FIG. 1, which is a perspective view showing a mechanical configuration of a parallel kinematic machine embodying the invention, the parallel kinematic machine 1 includes a base 10 supported by a support platform 2 and an end effecter 20. Six joints 11 to 16 are provided in the base 10, and six joints 21 to 26 are provided in the end effecter 20. Six struts 31 to 36 are connected to the joints 11 to 16, and to the six joints 21 to 26, respectively. The struts 31 to 36 are individually expanded or contracted by a numerical control device to thereby move the end effecter 20, and to apply a specified processing to a work placed on a work holder 3.

Specifically, the end effecter 20 is held in the base 10 via a parallel link mechanism which is constituted of the joints 11 to 16 in the base 10, the struts 31 to 36, and the joints 21 to 26 in the end effecter 20. The base 10, the parallel link mechanism, and the end effecter 20 constitute a parallel kinematic mechanism 4. The work holder 3 or a reference board 60 as an example of a reference object, which will be described later, includes a reference surface 5 that is a finely machined or processed. For calibration, an adjustment tool 50 is attached to the end effecter 20, with the axis of the adjustment tool 50 being in agreement with an axis of the end effecter 20.

In the specification, the term "forward kinematics" means calculation of a posture (including position coordinates and orientation coordinates) of the end effecter 20 based on the lengths of the struts 31 to 36 in the parallel kinematic machine 1 and in the parallel kinematic mechanism 4. Contrary to this, the term "inverse kinematics" means calculation of lengths of the struts 31 to 36 based on the position coordinates and the orientation coordinates of the end effecter 20. The term "position coordinates" means coordinate values (X, Y, Z) representing a position of the end effecter 20 on X-, Y-, and Z-axes, and the term "orientation coordinates" means coordinate values (A, B, C) representing an orientation of the end effecter 20 in the X-axis direction, the Y-axis direction, and the direction of the axis of the end effecter 20 i.e. rotation angles or orientation angles about the X-axis, Y-axis, and Z-axis of the end effecter 20, respectively.

Figure 2:
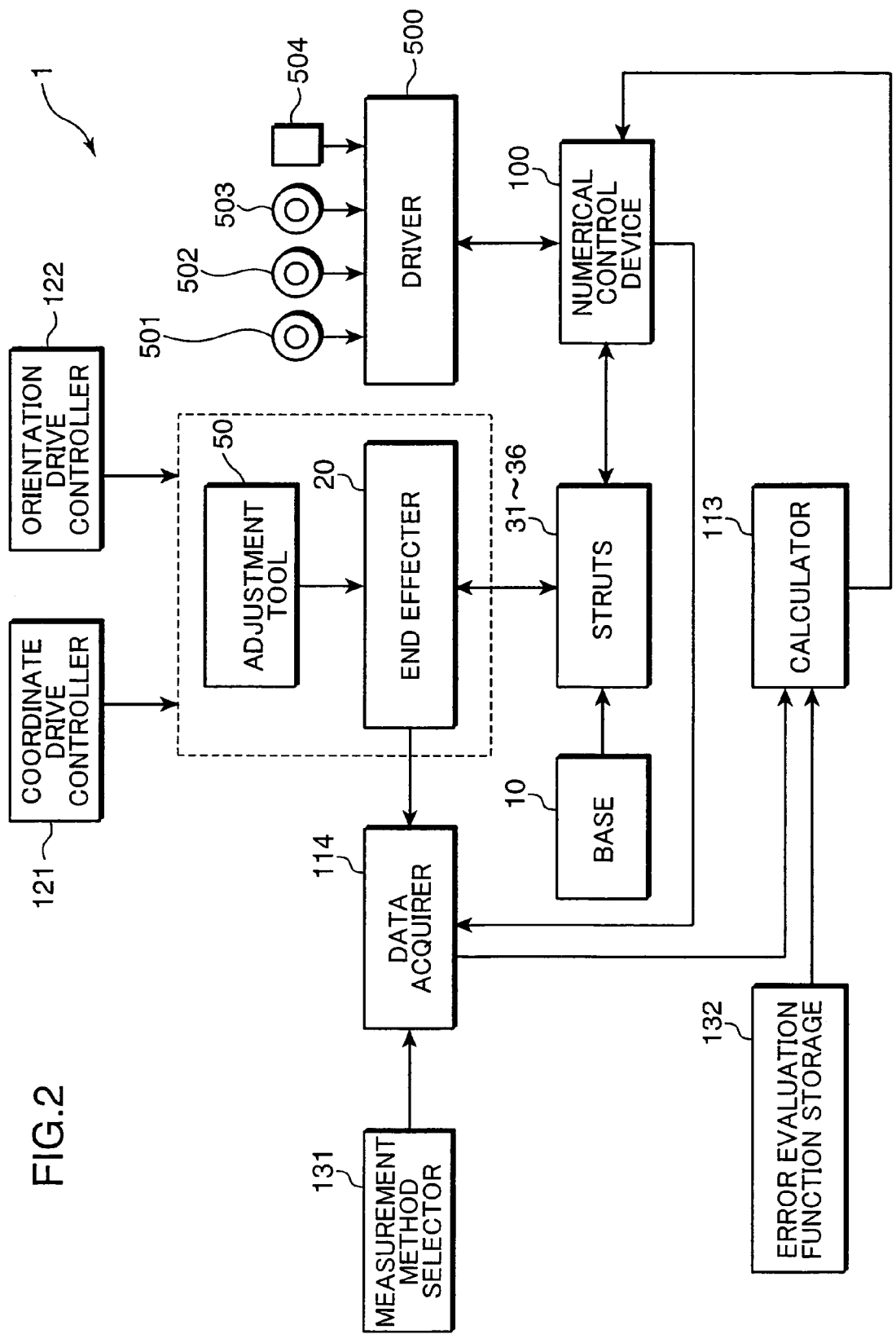
FIG. 2 is a block diagram showing a functional relationship between principal parts of the parallel kinematic machine.

FIG. 2 is a block diagram showing an overview of a functional configuration of the parallel kinematic machine according to the embodiment of the invention. Each block shown in this figure represents each processing carried out in data acquisition and data analysis, but does not necessarily coincide with each function of the parallel kinematic machine. For instance, in the parallel kinematic machine 1, a coordinate drive controller 121 and an orientation drive controller 122 are both actuated in the inverse kinematics of a numerical control device 100.

The parallel kinematic machine 1, which is provided with the base 10 supported by the support platform 2, the end effecter 20, the six struts 31 to 36 for connecting the base 10 and the end effecter 20 by way of the joints provided in the base 10 and the end effecter 20, and the work holder 3 or the reference board 60, is further provided with the numerical control device 100. The numerical control device 100 controls the position and the orientation of the end effecter 20 in accordance with the kinematics by adjusting strut coordinates i.e. driver shaft coordinates representing the respective lengths of the struts 31 to 36 as driver shafts, and controls the strut coordinates in accordance with the inverse kinematics based on the position and the orientation of the end effecter 20.

The numerical control device 100 stores therein an orientation command, as well as the strut coordinates. The orientation command is data concerning the orientation of the end effecter 20 which is also stored in the numerical control device 100. The strut coordinates and the orientation command are closely related to the kinematics based on kinematic parameters set in the numerical control device 100. For instance, strut coordinates obtained by converting the orientation command stored in the numerical control device 100 in accordance with the inverse kinematics based on the kinematic parameters set in the numerical control device 100 are coincident with the strut coordinates stored in the numerical control device 100.

The numerical control device 100 is capable of executing a function of a requested program by installing the requested program from a recording medium recorded with various information via a driver 500. The recording medium such as a magnetic disk 501, a magneto-optical disk 502, an optical disk 503, or a semiconductor memory 504 stores therein the program for executing a process to realize the inventive calibration technology, as well as requested arithmetic expressions, a table, and the like.

The coordinate drive controller 121 and the orientation drive controller 122 control the position and orientation of the adjustment tool 50 attached to the end effecter 20, respectively, with the axes of the end effecter 20 and the adjustment tool 50 being in agreement with each other, when carrying out calibration. If the kinematic parameters set in the numerical control device 100 are inaccurate, the coordinate system representing the position coordinates of the end effecter 20 which is handled in the kinematics of the numerical control device 100 is not accurate. Such an inaccurate coordinate system is not appropriate as a coordinate system for the parallel kinematic machine 1. In view of this, a reference coordinate system 6 is established for the parallel kinematic machine 1 at a predetermined position on the reference board 60 (see FIG. 3) independently of the parallel kinematic mechanism 4 prior to the calibration. The reference coordinate system 6 is an XYZ right-hand Cartesian coordinate system with the X-axis and the Y-axis parallel to the reference surface 5.

The coordinate drive controller 121 and the orientation drive controller 122 carry out a posturing step of setting the end effecter 20 in a predetermined posture or posturing position capable of defining a posturing relation to a reference object which is disposed in a known position in the reference coordinate system 6, and has a known configuration. In the specification, the expression "predetermined posture or posturing position capable of defining a posturing relation to the reference object" includes not only the known position of the reference object in which the reference object is disposed, but also postures capable of measuring relative differences to the reference object. Examples of the reference objects are a reference flat surface, a reference hole, a reference pin, and a reference ball. It is also possible to use a double ball bar (DBB) system. In the case where precise posturing is executed including an orientation angle of the end effecter 20, a reference hole formed in a finely machined or processed upper surface of the reference board 60, or a reference pin that is attached to a finely machined or processed surface of the reference board 60 is used as the reference object.

A measurement method selector 131 is provided so that in manual operation, an operator of the machine 1 can manually enter a measurement method selecting code which designates a measurement method to be used in acquiring data, namely, to select a reference object for posturing. The measurement method selector 131 sends the designated measurement method selecting code to a data acquirer 114. On the other hand, in automatic operation, since the measurement method selecting codes are written in a program describing a data acquisition procedure, the measurement method selector 131 reads out the intended measurement method selecting code, and sends the readout code to the data acquirer 141. In the embodiment, description is made on a case that data is acquired by the manual operation.

An error evaluation function storage 132 stores at least one function that is designated by the measurement method selecting code selected by the measurement method selector 131 for evaluation of acquired data, which will be described later. The function is an error evaluation function, which serves as a relational expression describing the forward kinematics of the parallel kinematic mechanism 4 of the parallel kinematic machine 1.

The data acquirer 114 executes a data acquiring step of acquiring data which has a format in accordance with the measurement method selecting code designating the measurement method used in the above posturing step of setting the adjustment tool 50 in the predetermined posture, and which defines a correlation between kinematics parameters required in the kinematics of the parallel kinematic mechanism 4, and the reference coordinate system 6. The acquired data includes end effecter posture specifying information for defining at least a part of the position and the orientation of the end effecter 20 in the reference coordinate system 6, including the measurement method selecting code, and driver shaft coordinates for defining a correlation between the posturing of the end effecter 20 and the kinematic parameters. The data acquirer 114 sends the acquired data to a calculator 113. The data acquired in the data acquiring step should be a sufficient number of data to define relational expressions that are independent of each other so as to identify the kinematic parameters. To this end, it is necessary to change the orientation of the end effecter 20 in order to acquire the sufficient number of data.

The driver shaft coordinates correspond to the strut coordinates or the orientation command. In the following, description is made on a case where the strut coordinates are acquired as the driver shaft coordinates. In the case where the orientation command is acquired, the orientation command may be converted into strut coordinates in accordance with the inverse kinematics based on the kinematic parameters set in the numerical control device 100.

The calculator 113 is provided with a computer, and carries out a posturing step of setting the end effecter 20 in predetermined different postures. A data acquiring step is executed each time the posturing step is executed, and the calculator 113 executes a calculating step of calculating kinematic parameters necessary for the kinematics of the parallel kinematic mechanism 4 based on the data acquired in the data acquiring steps.

In execution of the calculating step, the calculator 113 calculates kinematic parameters by using the acquired data sets of the sufficient number for identifying the kinematic parameters and by minimizing the sum of the error evaluation function stored in the error evaluation function storage 132. In the calculation of the kinematic parameters, the calculator 113 extracts the error evaluation function designated by the measurement method selecting code in each of the acquired data among the error evaluation functions stored in the error evaluation function storage 132, and uses the extracted error evaluation function.

Figure 3:
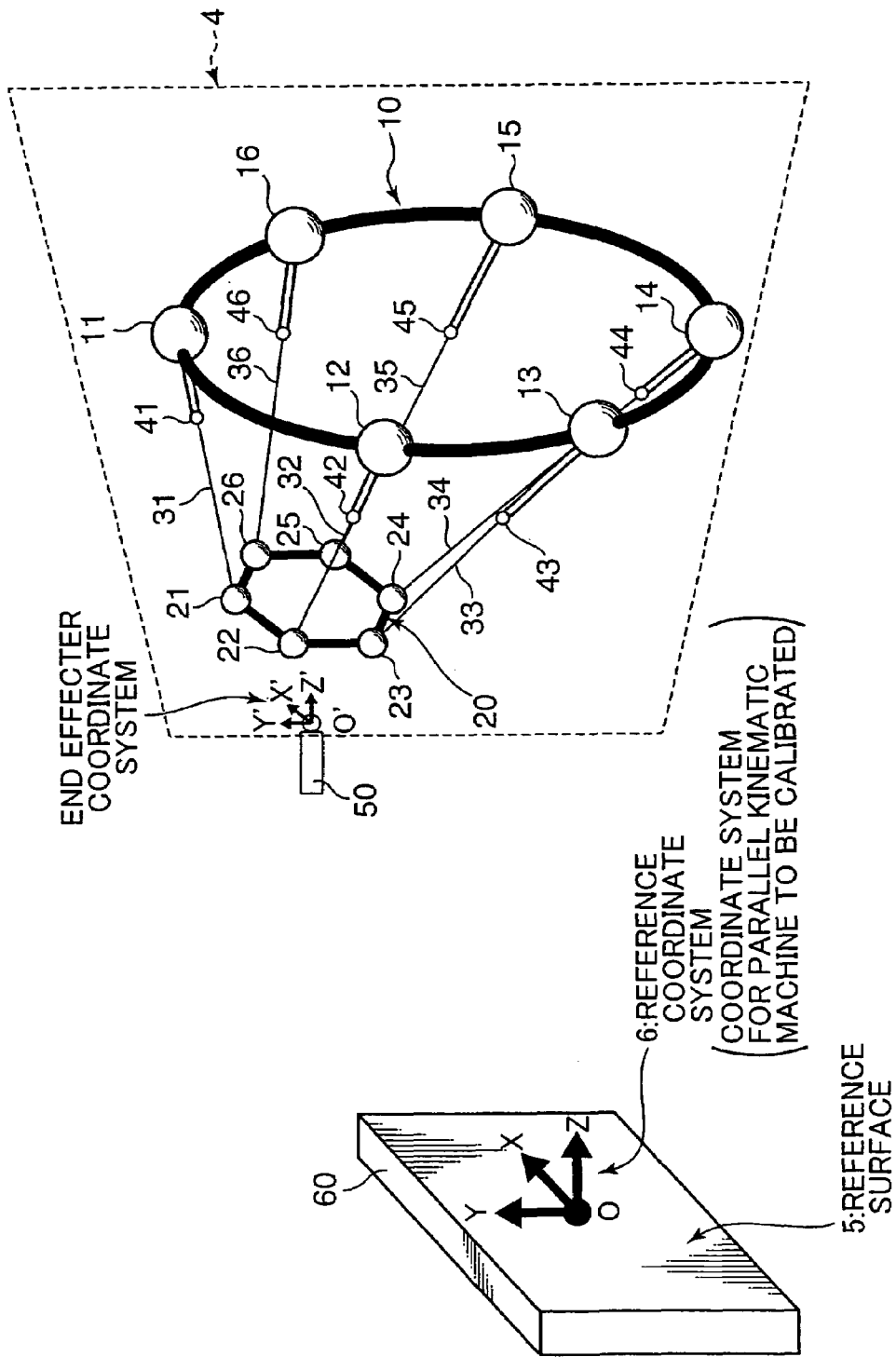
FIG. 3 is a schematic diagram showing a configuration of a 6×6 Stewart platform having 6 degrees of freedom which is adoptable in the parallel kinematic machine.

Referring to FIG. 3 schematically showing a configuration of the 6×6 Stewart platform having 6 degrees of freedom, which is adopted in the parallel kinematic machine 1, the origin of the reference coordinate system 6 is indicated at O. Indicated at O' is the origin of an end effecter coordinate system which is a coordinate system borne on the end effecter 20.

The six joints 11 to 16 provided in the base 10 are expressed by position vectors N[j](j=1, 2, 3, 4, 5, 6) whose starting point is the origin O of the reference coordinate system 6. For instance, N[1] represents the position vector of the joint 11 where j=1. The six joints 21 to 26 provided in the end effecter 20 are expressed by position vectors T[j] (j=1, 2, 3, 4, 5, 6) whose starting point is the origin O' of the end effecter coordinate system. Origins 41 to 46 of the struts 31 to 36 are expressed by position vectors o[j](j=1, 2, 3, 4, 5, 6) whose starting point is at the joints 11 to 16 in the base 10. The position vector o[j] is hereinafter also referred to as "origin offset". The above-mentioned position vectors N[j], T[j] and o[j] are kinematic parameters of the parallel kinematic machine 1. Hereinafter, all or a part of these kinematic parameters are generally referred to as x[j] (j=1, 2, 3, . . . , n) where n indicates the number of kinematic parameters to be obtained.

On the other hand, the positions of the joints 21 to 26 in the postured end effecter 20 are expressed by position vectors t[j](j=1, 2, 3, 4, 5, 6) whose starting point is the origin O of the reference coordinate system 6, and respective vectors to the joints 21 to 26 of the end effecter 20 from the origins 41 to 46 of the struts 31 to 36 are indicated at s [j](j=1, 2, 3, 4, 5, 6). It should be noted that in the case that the kinematic parameters are accurate and free from mechanical error-causing factors such as gravity deformation or backlash, the distance between the position vectors N[j] and t[j] is identical to the sum of the vectors s[j] and o[j].

As mentioned above, when executing calibration, the adjustment tool 50 is attached to the end effecter 20 with the axis of the adjustment tool 50 being in agreement with the axis of the end effecter 20. The position of the tip end of the adjustment tool 50 is expressed by position vectors p[1], p[2], and p[3] (X, Y, and Z coordinate values, respectively) in the reference coordinate system 6, and the orientation coordinates of the tip end of the adjustment tool 50 are shown by p[4], p[5] and p[6] (rotation angles or orientation angles about A-, B-, and C-rotational axes, respectively). With the end effecter 20, a side surface is specified as a reference surface to determine a reference orientation of the end effecter 20 with respect to the axis of the end effecter 20.

For a calibration, the reference object (not shown) such as a reference hole, a reference pin, a reference ball, a reference flat surface, or a fixed ball of a DBB system is provided at a predetermined position in the reference coordinate system 6. The posturing of the end effecter 20 is performed by setting the adjustment tool 50 in a certain posture relative to the reference object. Also, use of a reference jig having a finely machined or processed flat surface and plural reference holes each of which is finely and vertically formed in the flat surface is practically preferable in light of performing posturing of the end effecter 20 including an orientation angle thereof.

The reference coordinate system 6 has a Z-axis perpendicularly intersecting the reference surface 5 of the reference board 60, the Y-axis extending vertically on the reference surface 5 of the reference board 60, the X-axis extending horizontally over the reference surface 5 of the reference board 60, and perpendicularly intersecting both the Y-axis and the Z-axis, and an origin at the position where the three axes intersect one another. Specifically, the Z-axis has positive values from the origin toward the parallel kinematic machine 1, the Y-axis has positive values from the origin upwards, and the X-axis has positive values from the origin backwards. Thus, the X-, Y-, Z-axes coordinates constitute the right-hand Cartesian coordinate system. Also, in a rotation around the X-axis, the X-axis is called A-rotational axis; in a rotation around the Y-axis, the Y-axis is called B-rotational axis; in a rotation around the Z-axis, the Z-axis is called C-rotational axis. A clockwise rotation about each of the A-, B-, and C-rotational axes in the positive direction has positive values.

Next, calibration of the parallel kinematic machine 1 will be described in a first mode, wherein a reference tool including dial gauges is used as the adjustment tool 50, and posturing of the end effecter 20 including an orientation angle thereof is manually performed relative to a reference hole formed in a finely machined or processed upper surface of a jig plate; in a second mode, wherein a measurement probe is used as the adjustment tool 50, and the measurement probe is directly contacted with a reference surface of a reference block; in a third mode, wherein a measurement probe is used as the adjustment tool 50, and the measurement probe is contacted with an inner wall of a reference hole; in a fourth mode, wherein a measurement probe is used as the adjustment tool 50, and the measurement probe is contacted with a reference ball; and in a fifth mode using a DBB system.

It is needless to say that in all of the first through fifth modes, the accurate length of the adjustment tool is stored in the numerical control device 100. The length of the adjustment tool in the second through fifth modes means the length from the side surface of the end effecter 20 to the center of a ball at a tip end of the measurement probe or to the center of a movable ball of the DBB system.

The first mode describes a case where a part of all kinematic parameters (hereinafter, also called as "total kinematic parameters") of the parallel kinematic mechanism 4 is fixed as known kinematic parameters, and kinematic parameters other than the fixed kinematic parameters are calculated. In the description on the calculator 113, a calculation approach of identifying the total kinematic parameters is described on a premise that the calculation approach is universally usable. In the case where the above calculation approach is applied to a case where a part of the total kinematic parameters is handled as fixed known parameters, kinematic parameters x [ ] are arranged in the order of kinematic parameters to be calculated, i.e. kinematic parameters in the total kinematic parameters excluding the fixed known kinematic parameters, and the fixed known kinematic parameters. In this case, the kinematic parameters x [ ] described as kinematic parameters in the kinematics, (which is sometimes simply called as kinematic parameters) are regarded as the total kinematic parameters, and the kinematic parameters x [ ] described as an object to be calculated by the calculator 113 are regarded as the kinematic parameters to be calculated. It should be noted that partial differentiation by kinematic parameters is applied to the parameters described as the object to be calculated by the calculator 113.

Also, the description on the calculator 113 in the first mode includes description on simultaneous calculation of an unknown other than the kinematic parameters, along with the kinematic parameters to be calculated. Accordingly, in the first mode, the kinematic parameters x [ ] (which is sometimes simply called as kinematic parameters) include the unknown other than the kinematic parameters, wherein the kinematic parameters x [ ] are arranged in the order of the kinematic parameters to be calculated, the unknown other than the kinematic parameters, and the fixed known kinematic parameters. In the case where the kinematic parameters x [ ] (which is sometimes simply called as kinematic parameters) are described as kinematic parameters in the kinematics, the kinematic parameters x [ ] indicate the total kinematic parameters. In the case where the kinematic parameters x [ ] are described as the kinematic parameters to be calculated, the kinematic parameters [x] indicate the kinematic parameters to be calculated, and the unknown other than the kinematic parameters.

[First Mode]

In the first mode, the position of each joint of the end effecter 20 is calculated by using a three-dimensional measuring machine or a like device, and kinematic parameters other than the fixed kinematic parameters are calculated by fixing the position of each joint. The first mode employs a data acquisition process of performing fine posturing including an orientation angle of the end effecter 20, by operating a manual handle, relative to a reference hole formed in a finely machined or processed upper surface of a reference jig, with use of dial gauges. This mode can be applied to a case where the origin of the coordinate system for kinematic parameters set in the numerical control device 100 considerably differs from the origin of the reference coordinate system 6 newly defined on the reference jig attached to a work holder 3. In this mode, the X-, Y-, Z-axes, and the A-, B-, and C-rotational axes are adjusted by operating the manual handle to perform posturing of the end effecter 20 relative to a reference hole 71 in the jig plate 70. In this mode, assuming that the position vectors T[j] (j=1, 2, 3, 4, 5, 6) of the joints 21 to 26 in the end effecter 20 are known, kinematic parameters other than the known position vectors are calculated. The posturing process by operating the manual handle is similar to an adjustment operation with use of a 5-axis machine. Accordingly, a machine operator is easily accustomed to the posturing operation. Also, the posturing process can be executed with use of a known machine tool without a modification.

The machine 1 is provided with a push button or a selector switch for selecting the manual handle mode, and a selector switch for selecting one(s) of the twelve axes including the X-, Y-, Z-axes, A-, B-, C-axes, and strut axes that are to be operated by the manual handle. The manual handle provided on the machine 1 generates a positive or negative movement pulse for moving the end effecter 20 with respect to a selected axis in accordance with a rotation of the manual handle. Further, the machine 1 is provided with a selector switch for selecting a unit of movement amount per graduation of a scale provided on a specified portion of the manual handle. The machine 1 has a numerical control function of receiving the generated movement pulses as a movement command with respect to the selected axis, and calculating coordinates after the movement by adding coordinates corresponding to the movement pulses to the current coordinates, thereby changing the orientation of the end effecter 20.

However, the following description is made about a case where adjustment of the end effecter 20 with respect to the X-, Y-, or Z-axis is done to change the position of the end effecter 20, and adjustment of the end effecter 20 with respect to the A-, B-, or C-axis is done to change the orientation of the end effecter 20, but adjustment of the end effecter 20 with respect to the strut axis is not done.

Figure 4A:
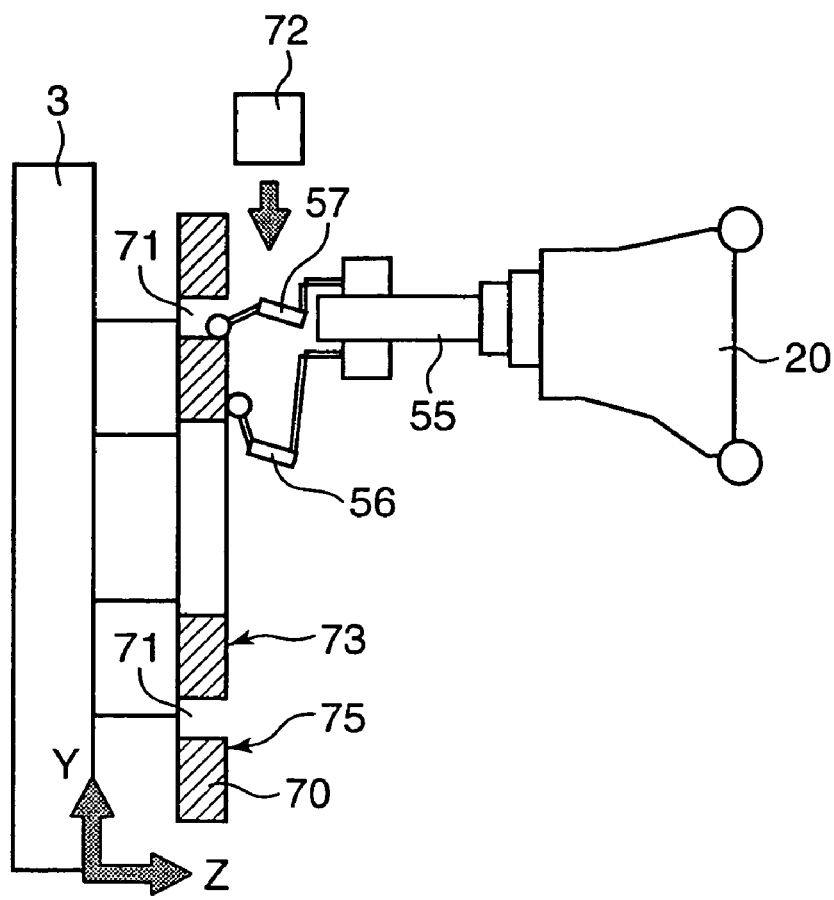
FIGS. 4A and 4B are illustrations for describing a data acquisition process in a first mode of the embodiment.
Figure 4B:
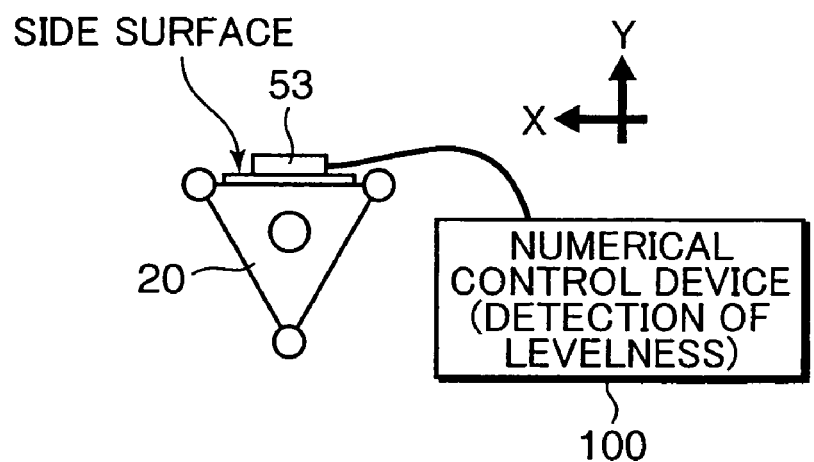

FIGS. 4A and 4B are illustrations for describing a data acquisition process in the first mode, wherein FIG. 4A shows a step of acquiring position coordinates of the end effecter 20 with respect to the X-, Y-, Z-axes, and orientation angles with respect to the A- and B-axes, and FIG. 4B shows a step of acquiring an orientation angle of the end effecter 20 with respect to the C-axis. The C-axis is defined as a reference orientation of the end effecter 20. In this mode, first, the jig plate 70 is accurately set in a known position in the reference coordinate system 6. The jig plate 70 has the reference holes 71 formed at predetermined respective positions in a reference hole upper surface 75 flush with a reference upper surface 73 that is a finely machined or processed flat surface. The reference hole upper surface 75 constitutes the upper surface of the jig plate 70 where the reference holes 71 are formed, and perpendicularly intersects an axis of a cylindrical inner wall of each reference hole 71. The intersection of the axis of the inner wall of the reference hole 71 with the reference hole upper surface 75 is defined as center position coordinates of the reference hole 71.

"To accurately set the jig plate 70" means installing the jig plate 70 at such a position that enables to make the reference hole upper surface 75 of the jig plate 70 having the reference holes 71 parallel to the XY-plane in the reference coordinate system 6, and to determine the center position coordinates of the reference hole 71 in the reference coordinate system 6. The center position coordinates of the reference hole 71 are defined (x0, y0, z0). A predetermined number of the reference holes 71 are formed at respective appropriate positions in the jig plate 70, although FIG. 4A shows two reference holes 71. In this mode, a reference tool 55 attached with dial gauges 56 and 57, shown in FIG. 4A, is used as the adjustment tool 50.

As shown in FIG. 4B, a leveler 53 is provided on the side surface of the end effecter 20 to determine the reference orientation of the end effecter 20 i.e. the C-axis. Specifically, in this mode, a horizontally-mounted parallel kinematic machine 1, in which the normal line direction of the base 10 perpendicularly intersects the vertical direction on the plane of FIG. 1, is used to determine the reference orientation of the end effecter 20 i.e. the C-axis. The reference orientation of the end effecter 20 i.e. the C-axis is determined by placing the side surface of the end effecter 20 horizontally.

In this mode, posturing of the end effecter 20 is performed relative to the reference hole 71 and the reference hole upper surface 75 of the jig plate 70. Accordingly, the operator selects type=1 shown in Table 1, as a measurement method, by operating the measurement method selector 131 prior to a calibration. The term "reference hole" as a reference object to be measured in the first mode includes the reference hole upper surface where the reference holes are formed. The calculator 113 extracts the error evaluation function corresponding to type=1 i.e. the equation (4) or the equation (9) from the error evaluation function storage 132, and uses the extracted error evaluation function in calculating kinematic parameters.

Figure 5:
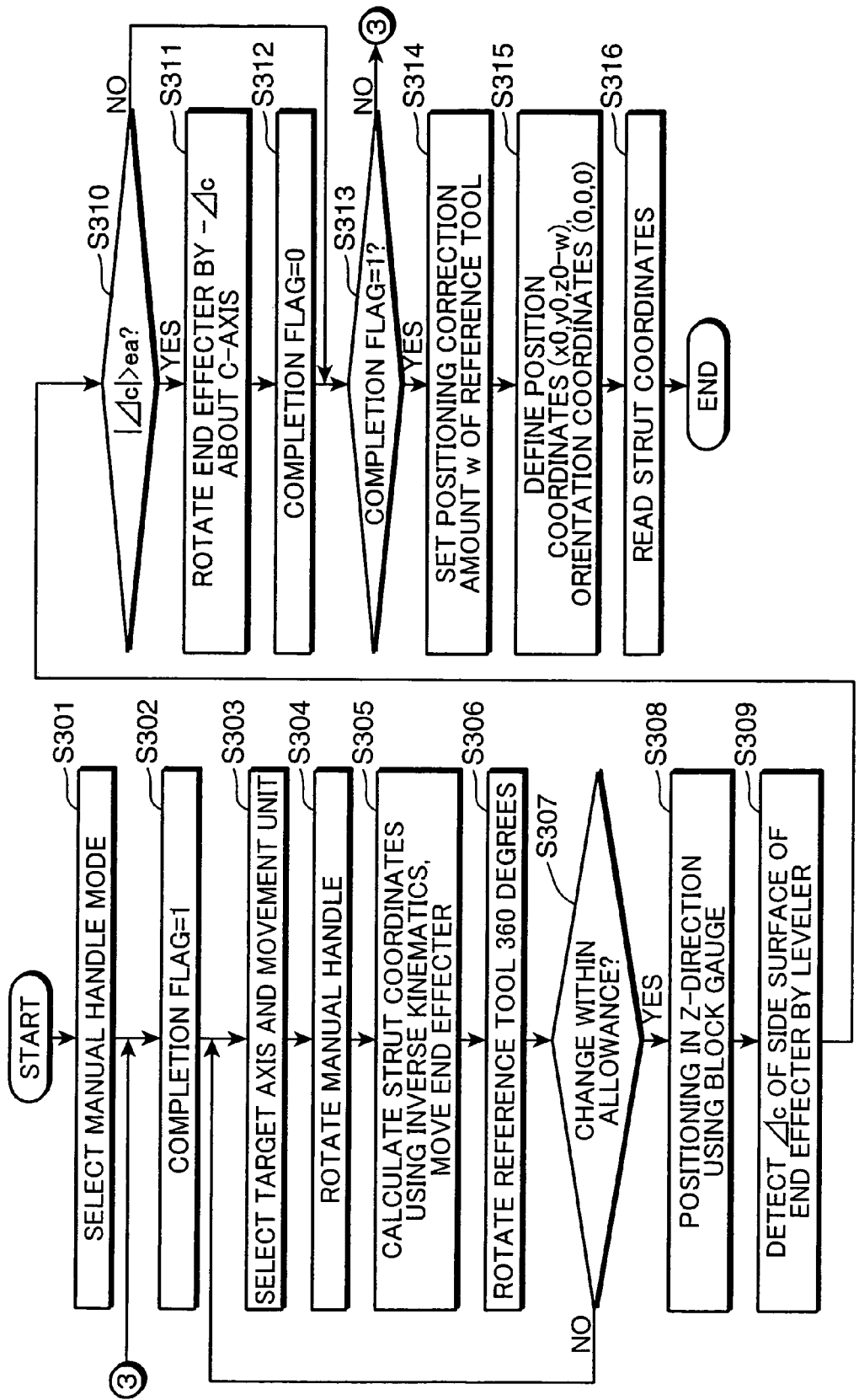
FIG. 5 is a flowchart showing a flow of operations to execute the data acquisition process in the first mode.

FIG. 5 is a flowchart showing a flow of operations to execute the data acquisition in the first mode. When the operator of the machine 1 selects the manual handle mode by the selector switch (Step S301), the completion flag is set to "1" (Step S302). After the operator selects a target axis to be adjusted among the X-, Y-, Z-, A-, B-, and C-axes by the selector switch, a desired movement unit of the manual handle is selected (Step S303), and the manual handle is rotated (Step S304).

The numerical control device 100 detects the selected movement unit and a graduation indicative of a rotation amount of the manual handle, and calculates a movement amount of the end effecter 20 with respect to the selected axis, and calculates a position or angle of the end effecter 20 after movement. The moved position or angle is obtained by adding the calculated movement amount to the current position or angle of the end effecter 20. The numerical control device 100 calculates strut coordinates based on the calculated position or angle using inverse kinematics, and causes the end effecter 20 to move by driving struts (Step S305). In this manual handle operation mode, the orientation change with respect to the A-, B-, or C-axis is done about the tip end of the reference tool 55.

Next, the operator manually rotates the reference tool 55 by 360 degrees while keeping the end effecter 20 from moving (Step S306). In this time, the operator sees a change in the dial gauges 56 and 57 to thereby judge whether the change is within an allowance (Step S307). In this operation, the dial gauges 56 and 57 are made contact with the inner wall of the reference hole 71 and the reference hole upper surface 75 each time the reference tool 55 is rotated, thereby detecting the zero point. There is no need of acquiring an absolute value for the change with respect to the X- and Y-axes and the A- and B-axes. If the change is beyond allowance (NO in Step S307), the flow returns to Step S303. On the other hand, if the change is judged to be within the allowance (YES in Step S307), the flow advances to positioning in the Z-direction.

In this mode, the Z-direction positioning is accomplished by inserting a block gauge 72 having a known thickness between the reference surface of the jig plate 70 and the tip end of the reference tool 55 (Step S308). Then, the reference orientation of the end effecter 20 i.e. the C-axis is set.

In setting the reference orientation of the end effecter 20 i.e. the C-axis, first, a tilt $\Delta c$ of the side surface of the end effecter 20 is detected by the leveler 53 disposed on the side surface of the side effecter 20 (Step S309). If the detection result indicates $|\Delta c|>ea$ (YES In Step S310), the end effecter 20 is rotated by $-\Delta c$ about the C-axis (Step S311), and the completion flag is set to "0" (Step S312). On the other hand, if the detection result in Step S310 is negative (NO in Step S310), the completion flag remains "1", whereby setting of the reference orientation of the end effecter 20 i.e. the C-axis is completed.

Next, a judgment is made whether the completion flag remains "1" (Step S313). If the judgment result indicates that the completion flag is set to "0" (NO in Step S313), the judgment result means that the flow passes Steps S311 and S312, in other words, the C-axis is changed, and the positions of the X-, Y-, Z-, A-, and B-axes are slightly shifted due to the change of the C-axis. Accordingly, the flow returns to Step S302 to define position coordinates of the end effecter 20 again. On the other hand, if the judgment result indicates that the completion flag remains "1" (YES in Step S313), the judgment result means that all the adjustments with respect to the X-, Y-, Z-, A-, B-, and C-axes are completed. Orientation coordinates of the end effecter 20 are determined by the orientation drive controller 122.

Next, fine posturing is performed. First, the thickness of the block gauge 72 is set as a positioning correction amount w of the tip end of the reference tool 55 (Step S314). Thereby, the position coordinates of the end effecter 20 for fine posturing are set at (x0, y0, z0+w). Also, orientation angles of the end effecter 20 are set to (0, 0, 0) (Step S315). Thus, the fine posturing is completed. Subsequently, the data acquirer 114 sends, to the calculator 113, the obtained position coordinates and orientation coordinates, as well as the measurement method selecting code (type=1) as end effecter posture specifying information. Further, the data acquirer 114 reads out the strut coordinates stored in the numerical control device 100 (Step S316), and sends the acquired strut coordinates as driver shaft coordinates to the calculator 113. Thus, the data acquiring process of acquiring data necessary for calculating kinematic parameters of the parallel kinematic machine 1 is completed.

In the foregoing, the posturing includes setting of the reference orientation of the end effecter 20 i.e. the C-axis. Alternatively, setting of the reference orientation of the end effecter 20 i.e. setting of the C-axis may be omitted, and the leveler 53 may be omitted. In other words, in this mode, it is possible to calculate kinematic parameters accurately as far as at least the X-, Y-, Z-, A-, and B-axes are defined. Specifically, end effecter posture specifying information may be obtained by acquiring position coordinates (X, Y, Z) and two orientation coordinates (A, B) of the end effecter 20 in a certain posture in the reference coordinate system 6. The first mode describes a case that data is acquired based on a single reference object i.e. a single measurement method. Alternatively, data to be acquired in the second to fifth modes may be additionally used.

Next, a calibration process of the parallel kinematic machine 1 using the data acquired in the data acquiring process is described. In the first to fifth modes, the calibration is made based on relational expressions describing the forward kinematics in the parallel kinematic mechanism 4. As an altered form, it is possible to perform a calibration based on relational expressions describing the inverse kinematics. In the calibration based on relational expressions using the inverse kinematics, merely the data acquired in the data acquiring process of the first mode is used, in other words, data acquired in data acquiring processes of the second to fifth modes cannot be additionally used. The relational expressions describing the forward kinematics and the inverse kinematics are the following equations (1) and (2), respectively.

$$p[\,]=g(s[\,], x[\,])  \quad (1)$$

$$s[\,]=f(p[\,], x[\,])  \quad (2)$$

Specifically, in the forward kinematics, position coordinates and orientation coordinates p[ ] are calculated in accordance with the function g describing the forward kinematics, using strut coordinates s[ ] and kinematic parameters x[ ]. Similarly, in the inverse kinematics, strut coordinates s[ ] are calculated using the function f describing the inverse kinematics, using position coordinates and orientation coordinates p[ ]. Generally, the function form of the function f describing the inverse kinematics can be explicitly defined, whereas the function form of the function g describing the forward kinematics cannot be explicitly defined.

FIG. 6 is a flowchart showing a flow of operations to execute the calibration according to the embodiment. First, the calculator 113 receives, from the data acquirer 114, posturing data i.e. the position coordinates and the orientation coordinates p[idx][ ] acquired in Step S315 of the data acquiring process, type [idx] representing the measurement method, and the strut coordinates s[idx] [ ] acquired in Step S316 of the data acquiring process (Step S151). The type [idx] is constantly set to "1" in this mode. The type [idx] is a significant factor in additionally using the data acquired by the data acquiring processes in the second to fifth modes. The brackets [ ] are placed with one of numbers 1 to 6. [1], [2], and [3] respectively represent the X-, Y-, and Z-coordinates i.e. position coordinates. [4], [5], and [6] respectively represent A-, B-, and C-coordinates i.e. orientation coordinates. [idx] is an index for designating a data set or data sets, where idx=1, 2, 3, . . . , n (n is a data set number required in data acquisition).

Measurement values obtained by a three-dimensional measuring machine are used to specify the positions of the six joints in the end effecter 20. Accordingly, it is necessary to acquire relational expressions of the number identical to the number of kinematic parameters to be calculated other than the measurement values. In other words, twenty-four relational expressions or coordinate data are required: eighteen (j=3×6) data to specify the positions of the six joints in the base 10, where 3 means X-, Y-, Z-coordinates; and six data to specify origin offsets for the six struts. On the other hand, in the case where all the coordinate data with respect to the X-, Y-, Z-, A-, B-, and C-axes are obtained in setting of the end effecter 20 in a certain posture, six relational expressions or coordinate data are obtained from one data set. Accordingly, four or more data sets are required. In the case where the total kinematic parameters including the positions of the six joints in the end effecter 20 are identified, forty-two relational expressions or coordinate data are required: eighteen (=3×6) data to specify the positions of the six joints in the base 10; eighteen (=3×6) data to specify the positions of the six joints in the end effecter 20; and six data to specify origin offsets for the six struts. Accordingly, in this case, seven or more data sets are required.

The number of relational expressions in the specification means the number of relational expressions described independently of each other. If a relational expression derived from the acquired data has a subordinate relation to a certain relational expression, it is necessary to acquire data by setting the end posture in an appropriate posture or posturing position.

Next, the calculator 113 calculates kinematic parameters x[ ] that minimize the sum of the error evaluation function d with respect to the required data set number or more, as expressed by the following equation (3) (Step S152).

$$F = \sum_{idx=1}^{n} \{d(\text{type}[idx], p[idx][\,], s[idx][\,], x[\,], u[idx][\,])\} \quad (3)$$

The error evaluation function d has its own form depending on the kind of the reference object that is used in acquiring coordinate data concerning the position coordinates and orientation coordinates, in other words, in accordance with the measurement method. The error evaluation function is functioned as a relational expression describing the forward kinematics of the parallel kinematic machine 1. In other words, the error evaluation function is a relational expression that is directly derived from a relational expression describing the forward kinematics. Examples of the error evaluation function corresponding to the reference object to be measured are shown in Table 1.

TABLE 1

| TYPE | REFERENCE OBJECT | MODE | ERROR EVALUATION FUNCTION: d[TYPE,p,s,x,u] |
|---|---|---|---|
| 1 | REFERENCE HOLE | 1 | $\sum_{i=1}^{6} \{(p[i] - g[i]) \times u[i]\}^2$ |
| 2 | REFERENCE SURFACE | 2 | $\{(p[1] - g[1]) \times p[4] + (p[2] - g[2]) \times p[5] + (p[3] - g[3]) \times p[6]\}^2$ |
| 3 | REFERENCE CYLINDRICAL HOLE, REFERENCE PIN | 3 | $\left( p[7] - \sqrt{\dfrac{(p[1]-g[1])^2 + (p[2]-g[2])^2 + (p[3]-g[3])^2 -}{\{(p[1]-g[1]) \times p[4] + (p[2]-g[2]) \times p[5] + (p[3]-g[3]) \times p[6]\}^2}} \right)^2$ |
| 4 | REFERENCE BALL | 4 | $\left\{ p[4] - \sqrt{(p[1]-g[1])^2 + (p[2]-g[2])^2 + (p[3]-g[3])^2} \right\}^2$ |
| 5 | DBB SYSTEM | 5 | $\left\{ p[4] + \text{off} - \sqrt{(p[1]-g[1])^2 + (p[2]-g[2])^2 + (p[3]-g[3])^2} \right\}^2$ |

In this mode, the measurement method is type[idx]=1. Accordingly, the calculator 113 extracts the error evaluation function corresponding to type=1 from the error evaluation function storage 132, and performs computation based on the extracted error evaluation function i.e. the mathematical expression within the bracket { } of the following equation (4). In other words, the calculator 113 calculates the kinematic parameters based on the acquired data by directly using the equation (1) describing the forward kinematics of the parallel kinematic mechanism 4.

$$F = \sum_{idx=1}^{n} \left\{ \sum_{i} (p[idx][i] - g(s[idx][\,], x[\,])[i])^2 \right\} \quad (4)$$

Here, g(s[ ], x[ ])[i] indicates the i-th value of the function g. The equation (4) is derived based on a premise that position coordinates (and orientation coordinates) p[ ] of the end effecter 20 are in agreement with g(s[ ], x[ ]) in accordance with the basic equation of the forward kinematics as expressed by the equation (1), if the kinematic parameters are accurate and free from mechanical error-causing factors such as gravity deformation or backlash. The solution x[ ] that minimizes the equation (4) satisfies the following nonlinear simultaneous equation (5) that is obtained by performing partial differentiation with respect to the equation (4) using the respective kinematic parameters.

$$\frac{\partial F}{\partial x[i]} = 0 \; (i = 1, 2, 3, \ldots, m) \quad (5)$$

Here, m represents the kinematic parameter number. Since the nonlinear simultaneous equation (5) cannot be analytically solved, the equation (5) is solved by an asymptotic method such as Newton-Raphson method. Since the function form of the function g describing the forward kinematics is not explicitly defined, it is difficult to solve the function g analytically. However, even if the function form cannot be explicitly defined, the asymptotic method can be used as long as a solution of the function g, a first differentiation value and a second differentiation value with respect to the respective kinematic parameters of the function g are known.

First, initial values x0[ ] of kinematic parameters x0[ ] are set. The currently set kinematic parameters in the numerical control device 100 may be used as the initial values. Then, the equation (5) is solved by the asymptotic method. The equation (5) is solved by obtaining values c[i] in a first partial differentiation: x[ ]=x0[ ] using the kinematic parameter x[i] in F, obtaining values a[i][j] in a second partial differentiation: x[ ]=x0[ ] using the kinematic parameter x[j] in F, and by solving the following linear simultaneous equation (6) where c[i], a[i][j] are coefficients.

$$a[i][1] \times (x[1]-x(0)[1]) + \ldots + a[i][m] \times (x[m]-x0[m]) = -C[i] (i=1, 2, 3, \ldots, m) \quad (6)$$

Further, the solution obtained by solving the equation (6) i.e. the solution obtained by solving the nonlinear simultaneous equation (5) using the asymptotic method, is renewally defined as the initial values x0[ ]. This computation is cyclically repeated until the values x0[ ] are converged. It is, however, necessary to perform the first partial differentiation and the second partial differentiation with respect to the function g using the kinematic parameters in order to obtain a[i][j]. The first partial differentiation can be performed, for instance, by performing approximation using the following expression (7), where x1[i]=x0[i]−e/2 (e is a given small amount), x1[j]=x0[j] (j≠i), x2[i]=x0[i]+e/2, and x2[j]=x0[j] (j≠i).

$$\frac{\partial g(s[\,], x0[\,])}{\partial x[i]} \approx \frac{(g(s[\,], x1[\,]) + g(s[\,], x2[\,]))}{e} \quad (7)$$

Here the symbol "≈" indicates that the right side and the left side are almost equal to each other, and g(s[ ], x1[ ]) is a solution of g(s[ ], x[ ]) in x[ ]=x1[ ]. Similarly to the first partial differentiation, the second partial differentiation can be performed by performing approximation using the following expression (8), where x1[j]=x0[j]−e/2, x0[k]=x0[k] (k≠j), x2[j]=x0[j]+e/2, and x2[k]=x0[k] (k≠j).

$$\frac{\partial}{\partial x[j]} \left( \frac{\partial g(s[\,], x0[\,])}{\partial x[i]} \right) \approx \frac{\left( \frac{\partial g(s[\,], x1[\,])}{\partial x[i]} + \frac{\partial g(s[\,], x2[\,])}{\partial x[i]} \right)}{e} \quad (8)$$

The aforementioned algorithm that minimizes the equation (4) by the asymptotic method is merely an example, and minimization algorithms other than the above can be applied. Also, the above arithmetical approach enables to replace the conventional calibration algorithm that has been deemed to be complex with a simple minimum problem. In other words, the invention is directed to an approach of calculating kinematic parameters that minimize the equation (4) with respect to all coordinate data including the XYZ position coordinates and the ABC orientation coordinates, based on the acquired data of the required set number, in place of using the conventional complex approach.

Further, it is possible to convert the equation (4) into the following equation (9).

$$F = \sum_{idx} \left\{ \sum_i ((p[idx][i] - g(s[idx][\,], x[\,])[i]) \times u[idx][i])^2 \right\} \quad (9)$$

The solution x[ ] that minimizes the equation (9) can be obtained by implementing an approach similar to the approach of minimizing the equation (4), i.e. the equations (5) to (8). The coefficients u[idx][i] in the equation (9) are error evaluation coefficients of acquired data p[idx][i]. Each error evaluation coefficient is a given weighting coefficient to be multiplied for each of the position coordinates and the orientation coordinates. For instance, in the case where a part of the data p[idx][i] is failed to be acquired, the error evaluation coefficient for the un-acquired part of the data p[idx][i] is set to "0", and an appropriate error evaluation coefficient is multiplied for the acquired part of the data p[idx][i]. This approach is conducted for a case where calibration is conducted based on coordinate data with respect to the X, Y-, Z-, A-, and B-axes excluding coordinate data with respect to the C-axis, without using the leveler 53, or a case where merely a part of coordinate data to be described in the second to fifth modes is used, while discarding the rest of the coordinate data.

Specifically, in the case where the idx1-th data represents a position coordinate in the X-axis direction, u[idx1][1]=1 and u[idx][i]=0 (i=2, 3, . . . ) are designated. If the idx2-th data represents position coordinates in the X-, Y-, Z-axes directions, respectively, u[idx2][1]=1(i=1, 2, 3) and u[idx2][i]=0 (i=4, 5, 6) are designated. This approach enables to eliminate simultaneous measurement of coordinates with respect to the plural axes in acquiring data for calibration, thereby enabling to perform measurements individually with respect to the axes.

Also, the error evaluation coefficients can be used for adjusting the position coordinates (X, Y, Z) and the orientation coordinates (A, B, C) by changing each weighting coefficient for these units. Further, the operator is allowed to set the value of the error evaluation coefficient for target data to be acquired with respect to all the target axes to e.g. "1000", and set the value of the error evaluation coefficient for data to be acquired other than the target data to e.g. "1", thereby enabling to perform high-precision calibration, in which a significantly great weighting coefficient is applied to the reference posturing position of the end effecter 20.

In the first mode, at least a part of the position coordinates and the orientation coordinates that have been defined based on the reference holes 71, i.e., at least X, Y-, Z-, A-, B-coordinates, is made coincident with at least a part of coordinates g[s[ ], x[ ]] of the position coordinates and the orientation coordinates that are calculated using the forward kinematics described in the equation (1) based on the acquired strut coordinates s, as far as the kinematic parameters are accurate and free from mechanical error-causing factors such as gravity deformation or backlash. Specifically, a difference in position coordinate and orientation coordinate between the end effecter coordinate system and the reference coordinate system, e.g., a difference between X-coordinate of the reference hole 71, and X-coordinate calculated using the forward kinematics is defined as a posturing error. The error evaluation function corresponding to type=1 is defined by the posturing error. In other words, the error evaluation function explicitly includes the posturing error, and is used to evaluate the posturing error. This idea is applied to the second to fifth modes.

Next, the calculator 113 calculates kinematic parameters x that minimize the sum of the error evaluation function with respect to all the acquired data concerning type=1 shown in Table 1, using the error evaluation function d described in the equation (4).

In the case where an orientation command is used in place of the strut coordinates in the first mode, as well as in the second to fifth modes, the calculator 113 converts the orientation command into a strut coordinate using the inverse kinematics based on the currently set kinematic parameters in the numerical control device 100, and then calculates kinematic parameters using the strut coordinate.

[Second Mode]

FIGS. 7A and 7B are illustrations for describing a data acquiring process in a second mode of the invention, wherein FIG. 7A shows a tip end of an adjustment tool and its vicinity in executing the data acquiring process, and FIG. 7B is a side view viewed from an Y-axis direction. The second mode uses a reference block 610 which has a rectangular parallelepiped shape of known dimensions and has a reference flat surface arranged at a predetermined position. The dimensions of the reference block 610 is an example of configuration specifying information. The reference flat surface of the reference block 610 is an example of a reference object to be measured, and is defined by a point on a flat surface and a vector orthogonal to the surface.

First, the finely machined or processed reference block 610 is accurately disposed at a known position in the reference coordinate system 6. "To accurately dispose the reference block 610" means installing the reference block 610 at such a position that accurate values are determined for a coordinate value at a point on a contact site of the reference flat surface where a below-mentioned measurement probe and the reference surface corresponding to an upper surface or a side surface of the reference block 610 are contacted with each other, and for a vector orthogonal to the reference flat surface.

Then, the measurement probe 520, as an example of a spherical probe, whose radius r and length L are known, is used as the adjustment tool 50. The radius r is a radius of a ball at a tip end of the measurement probe 520, and the length L is the length of a bar portion of the measurement probe 520 including the diameter of the tip-end ball. The measurement probe 520 is attached to the end effecter 20, with the axis of the measurement probe 520 and the axis of the end effecter 20 in agreement with each other.

The measurement probe 520 is built in with a touch sensor, and is capable of sensing an object in contact therewith. A tool which has a similar configuration as the measurement probe 520 but is not built in with a touch sensor is called "ball bar", which is another example of the spherical probe. The measurement probe 520 can perform automatic measurement, whereas the ball bar can perform manual measurement only. The second to the fifth modes describe automatic measurement using the measurement probe 520 or a DBB system. However, a data acquisition procedure and a calibration method using the data acquisition procedure concerning the automatic measurement are also applied to the manual measurement.

In the second mode, the reference flat surface corresponding to the upper surface or the side surface of the reference block 610 serves as a reference object to be measured. Accordingly, the operator of the machine 1 selects type=2 in Table 1 as a measurement method by manipulating a measurement method selector 131 prior to a calibration. As an altered from, in the case where normal vectors to the surfaces of the reference block 610 are parallel to X-, Y-, Z-axes, respectively, type=1 is selected, in other words, a mode of defining X-, Y-, Z-coordinate values is selected, and an error evaluation coefficient with respect to a targeted axis for acquiring data is set to "1", whereas an error evaluation coefficient with respect to the axes other than the targeted axis is set to "0". After the selection of type=2, the calculator 113 extracts the error evaluation function corresponding to type=2 from the error evaluation function storage 132, and uses the extracted error evaluation function in calculating kinematic parameters. In the second to fourth modes, for sake of easy explanation, the radius r of the tip-end ball of the measurement probe 520 is omitted in the error evaluation functions shown in Table 1, assuming that the radius r is zero.

Next, as shown in FIG. 7A, the measurement probe 520 is made contact with the reference flat surface of the reference block 610 by automatically actuating the end effecter 20. At this time, the data acquirer 114 acquires the strut coordinates s stored in the numerical control device 100. The data acquirer 114 sends, to the calculator 113, the acquired strut coordinates as driver axis coordinates, as well as the coordinate value at the contact point on the reference flat surface, the orthogonal vector to the reference flat surface, and the measurement method selecting code (type=2) as end effecter posture specifying information. The aforementioned data acquiring process is cyclically repeated by changing the orientation of the end effecter 20, or changing the reference flat surface or measurement site of the reference block 610 until data of a certain set number sufficient for identifying kinematic parameters are acquired.

X-, Y-, Z-coordinate values at the contact point on the reference surface with the measurement probe 520 are defined as p[1], p[2], and p[3], respectively, and X-, Y-, Z-components of normal (unit) vectors to the reference flat surface are defined as p[4], p[5], and p[6], respectively. The distance from the flat surface expressed by p[ ], and the point indicated by the position coordinates g[s[ ], x[ ]] that are calculated using the forward kinematics based on the acquired strut coordinates s and the kinematic parameters x, namely, the position coordinates (hereinafter, in the specification, called as "center coordinates of the tip-end ball") at the center of the tip-end ball of the measurement probe 520 is coincident with the radius r of the tip-end ball of the measurement probe 520 if the kinematic parameters are accurate and free from mechanical error-causing factors such as gravity deformation or backlash. In other words, the difference between the reference flat surface corresponding to a surface of the reference block 610 defined by the position coordinates and the dimensions of the reference block 610, and an imaginary ball which has a center corresponding to the center coordinates of the tip-end ball of the measurement probe 520 which are calculated using the forward kinematics based on the strut coordinates stored in the numerical control device 100, and has a radius corresponding to the radius r of the tip-end ball, is defined as a posturing error. The error evaluation function corresponding to type=2 is defined by the posturing error. The calculator 113 calculates kinematic parameters x that minimize the sum of the error evaluation function corresponding to type=2 in Table 1 with respect to all the acquired data, wherein the error evaluation function d expressed as the equation (3) is used as the error evaluation function. With this process, accurate kinematic parameters can be obtained.

In the second mode, the upper surface and the side surface of the reference block 610 are used as the reference flat surface. The reference object to be measured may be any object other than the rectangular parallelepiped block, as far as the reference object satisfies the requirements that accurate values are known for a coordinate value at a contact point on a reference flat surface in contact with the measurement probe 520, and for a vector orthogonal to the reference flat surface, and that at least three reference flat surfaces that are not parallel to each other are defined. The effect of the second mode can be obtained advantageously in combination with the other modes.

[Third Mode]

FIGS. 8A to 8C are illustrations for describing a data acquiring process in a third mode of the embodiment, wherein FIG. 8A shows a tip end of an adjustment tool and its vicinity in executing the data acquiring process, FIG. 8B is a cross-sectional view taken along a plane parallel to an X-axis, FIG. 8C is a top plan view viewed from a Z-axis direction. First, a jig plate 611 formed with several reference cylindrical holes 630 at given positions is accurately disposed at a known position in the reference coordinate system 6. The reference cylindrical holes 630 each has a radius R whose value is known. The radius R is as an example of the configuration specifying information. The reference cylindrical hole 630 is an example of the reference object to be measured, and an inner wall of the reference cylindrical hole 630 is an example of a reference surface of the reference object to be measured.

"To accurately dispose the jig plate 611" means installing the jig plate 611 at such a position that accurate values are determined for coordinates (Xc, Yc, Zc) (hereinafter, called as center coordinates of the reference cylindrical hole 630) at a certain point on a centerline or an axis of the reference cylindrical hole 630, and for unit vectors in the axis direction of the reference cylindrical hole 630. The center coordinates of the reference cylindrical hole 630 function as position coordinates of the reference object.

Then, a measurement probe 520 whose radius r and length L are known is used as the adjustment tool 50. The measurement probe 520 is attached to the end effecter 20, with the axis of the measurement probe 520 and the axis of the end effecter 20 in agreement with each other.

In the third mode, the reference cylindrical holes 630 serve as the reference object to be measured. Accordingly, the operator of the machine 1 selects type=3 in Table 1, as a measurement method, by manipulating the measurement method selector 131 prior to a calibration. After the selection of type=3, the calculator 113 extracts the error evaluation function corresponding to type=3 from the error evaluation function storage 132, and uses the extracted error evaluation function in calculating kinematic parameters.

Next, as shown in FIGS. 8A and 8B, the end effecter 20 is automatically actuated to forward the measurement probe 520 into the reference cylindrical hole 630 and move the measurement probe 520 in an intended direction substantially horizontally i.e. in a direction substantially orthogonal to the axis of the reference cylindrical hole 630 to contact the measurement probe 520 with the inner wall of the reference cylindrical hole 630. At this time, the data acquirer 114 acquires the strut coordinates s stored in the numerical control device 100. The data acquirer 114 sends, to the calculator 113, the acquired strut coordinates as driver axis coordinates, as well as the center coordinates of the reference cylindrical hole 630, the unit vectors in a radial direction and the axis direction of the reference cylindrical hole 630, and the measurement method selecting code (type=3) as end effecter posture specifying information. The aforementioned data acquiring process is cyclically repeated by changing the orientation of the end effecter 20, or changing the reference cylindrical hole 630 to be measured, or changing the moving direction of the measurement probe 520 for contact with the inner wall of the reference cylindrical hole 630 until data of a certain set number sufficient for identifying kinematic parameters are acquired.

X-, Y-, Z-coordinates at the center of the reference cylindrical hole 630 are defined as p[1], p[2], and p[3], respectively and unit vectors in the axis direction of the reference cylindrical hole 630 are defined as p[4], p[5], and p[6], respectively. Further, a distance in radius between the reference cylindrical hole 630 and the tip-end ball of the measurement probe 520 is defined as p[7].

The radius difference (R−r) between the reference cylindrical hole 630 and the tip-end ball of the measurement probe 520 is coincident with the distance from the point indicated by the center coordinates of the tip-end ball that are calculated using the forward kinematics expressed as equation (1) based on the acquired strut coordinates s and the kinematic parameters x, to the point indicated by the center coordinates on the axis of the reference cylindrical hole 630, if the kinematic parameters are accurate and free from mechanical error-causing factors such as gravity deformation or backlash. In other words, the difference on a line connecting the center of the reference cylindrical hole 630 and the center of the tip-end ball of the measurement probe 520 between the inner wall of the reference cylindrical hole 630 that is calculated based on the center coordinates and the radius of the reference cylindrical hole 630, and an imaginary ball corresponding to the tip-end ball of the measurement probe 520, which is calculated using the forward kinematics based on the strut coordinates stored in the numerical control device 100, is defined as a posturing error. The error evaluation function corresponding to type=3 is defined by the posturing error. The calculator 113 calculates kinematic parameters x that minimize the sum of the error evaluation function corresponding to type=3 in Table 1 with respect to all the acquired data, wherein the error evaluation function d expressed as the equation (3) is used as the error evaluation function. With this process, accurate kinematic parameters can be obtained.

The third mode describes the arrangement that the reference cylindrical holes 630 are defined in the reference coordinate system 6. Alternatively, a reference pin as an example of the reference object to be measured may be attached in place of the reference cylindrical holes 630. FIGS. 9A and 9B are illustrations for describing a data acquiring process in the modified third mode, wherein FIG. 9A shows a tip end of an adjustment tool and its vicinity in executing the data acquiring process, and FIG. 9B is a partially enlarged view of FIG. 9A. In the modification, a column-shaped reference pin 640 is attached to a known position on a surface of a jig plate 612, which is disposed at a known position in the reference coordinate system 6. The modification using the reference pin 640 is different from the third mode using the reference cylindrical holes 630 in that whereas in the third mode, the radius difference (R−r) between the reference cylindrical hole 630 and the tip-end ball of the measurement probe 520 is used as a factor for measurement, in the modification, the radius sum (R+r) of the reference pin 640 and the tip-end ball of the measurement probe 520 is used as a factor for measurement. With the modified measurement, accurate kinematic parameters can be obtained by calculating kinematic parameters x that minimize the error evaluation function corresponding to type=3 in Table 1. The data obtained in the modified third mode may be used along with data obtained in the other modes.

[Fourth Mode]

FIGS. 10A and 10B are illustrations for describing a data acquiring process in a fourth mode of the invention, wherein FIG. 10A shows a tip end of an adjustment tool and its vicinity in executing the data acquiring process, and FIG. 10B is a partially enlarged view of FIG. 10A. First, a jig plate 613 provided with a reference ball 650 with a bar, as an example of the reference object to be measured, is accurately disposed at a known position in the reference coordinate system 6. The reference ball 650 whose radius R is known is provided at a predetermined position on a surface of the jig plate 613 by way of the bar. The radius R is as an example of the configuration specifying information. "To accurately dispose the reference jig 613" means installing the jig plate 613 at such a position that accurate values are determined for center coordinates (Xc, Yc, Zc) of the reference ball 650 in the reference coordinate system 6.

Then, a measurement probe 520 whose radius r and length L are known is used as the adjustment tool 50. The measurement probe 520 is attached to the end effecter 20, with the axis of the measurement probe 520 and the axis of the end effecter 20 in agreement with each other.

In the fourth mode, the reference ball 650 serves as the reference object to be measured. Accordingly, the operator of the machine 1 selects type=4 in Table 1 as the reference object to be measured, i.e. a measurement method by manipulating the measurement method selector 131 prior to a calibration. After the selection of type=4, the calculator 113 extracts the error evaluation function corresponding to type=4 from the error evaluation function storage 132, and uses the extracted error evaluation function in calculating kinematic parameters.

Next, as shown in FIGS. 10A and 10B, the end effecter 20 is automatically actuated to contact the measurement probe 520 with an outer surface of the reference ball 650. At this time, the data acquirer 114 acquires the strut coordinates s stored in the numerical control device 100. The data acquirer 114 sends, to the calculator 113, the acquired strut coordinates as driver axis coordinates, as well as the center coordinates and the radius of the reference ball 650, and the measurement method selecting code (type=4) as end effecter posture specifying information. The aforementioned data acquiring process is cyclically repeated by changing the contact site with the reference ball 650, or changing the orientation of the end effecter 20, or changing the arranged position of the reference ball 650 on the jig plate 613 until data of a certain set number sufficient for identifying kinematic parameters are acquired.

X-, Y-, Z-coordinates at the center of the reference ball 650 are defined as p[1], p[2], and p[3], respectively, and the sum of the radius R of the reference ball 650 and the radius r of the tip-end ball of the measurement probe 520 is defined as p[4].

The radius sum (R+r) of the reference ball 650 and the tip-end ball of the measurement probe 520 is coincident with the distance from the center of the reference ball 650 and the point indicated by the center coordinates of the tip-end ball of the measurement probe 520 that are calculated using the forward kinematics expressed as equation (1) based on the acquired strut coordinates s and the kinematic parameters x if the kinematic parameters are accurate and free from mechanical error-causing factors such as gravity deformation or backlash. In other words, the difference on a line connecting the center of the reference ball 650 and the center of the tip-end ball of the measurement probe 520 between the outer surface of the reference ball 650 that is defined by the center coordinates and the radius of the reference ball 650, and an imaginary ball which has a center corresponding to the center coordinates of the tip-end ball of the measurement probe 520 that are calculated using the forward kinematics based on the strut coordinates stored in the numerical control device 100, and which has a radius corresponding to the radius of the measurement probe 520, is defined as a posturing error. The error evaluation function corresponding to type=4 is defined by the posturing error. The calculator 113 calculates kinematic parameters x that minimize the sum of the error evaluation function corresponding to type=4 in Table 1 with respect to all the acquired data, wherein the error evaluation function d expressed as the equation (3) is used as the error evaluation function. With this process, accurate kinematic parameters can be obtained. The effect of the fourth mode can be obtained advantageously in combination with the other modes.

[Fifth Mode]

Figures 11A, 11B:
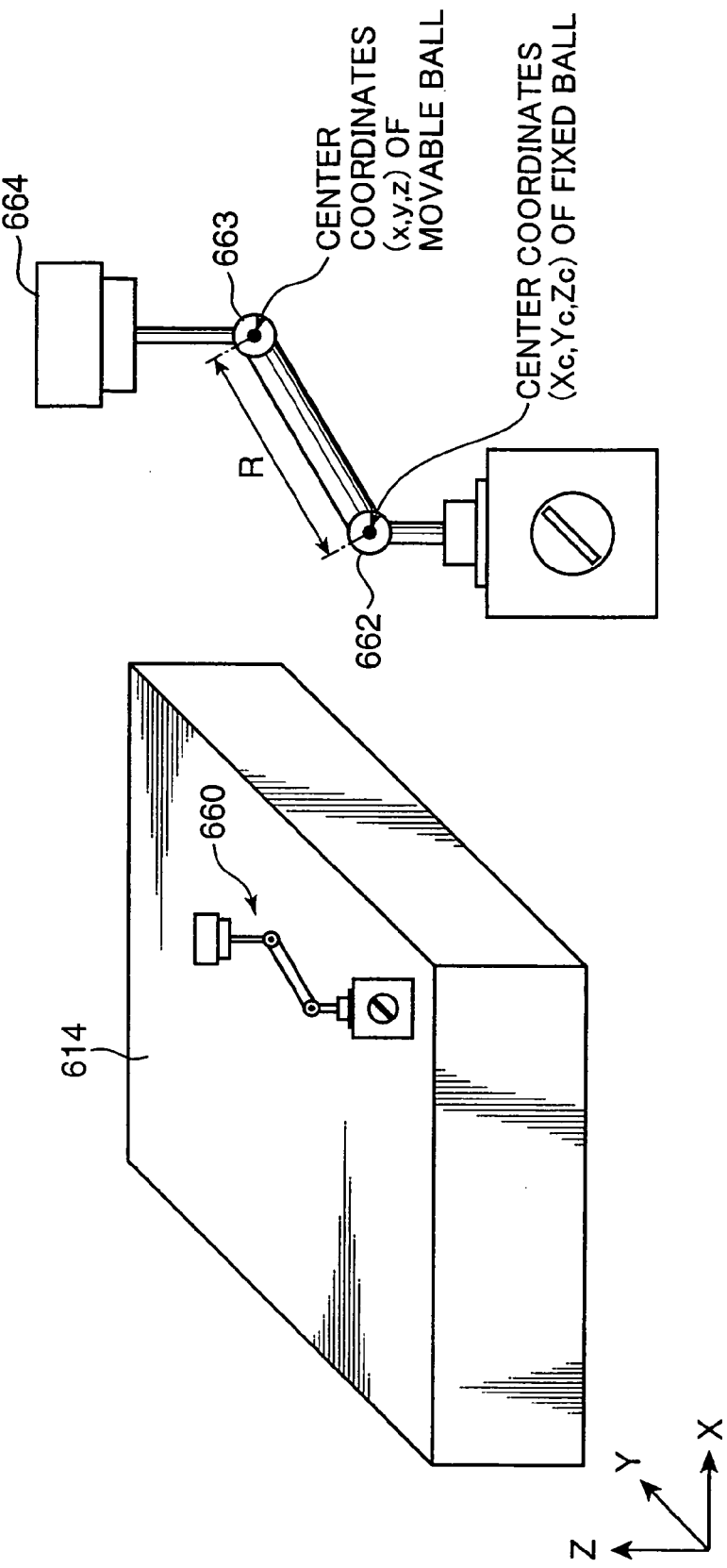

FIGS. 11A and 11B are illustrations for describing a data acquiring process in a fifth mode of the invention, wherein FIG. 11A shows a tip end of an adjustment tool and its vicinity in executing the data acquiring process, and FIG. 11B is a partially enlarged view of a DBB system. First, the DBB system 660, as an example of a range meter, is disposed at a known position in the reference coordinate system 6. At this time, the DBB system 660 is disposed at such a position that accurate values are determined for center coordinates of a fixed ball 662 of the DBB system 660. In the example of FIG. 11A, the DBB system 660 is provided on a surface of a jig plate 614.

Then, an adjustment tool 664 whose length L is known is used as the adjustment tool 50. The adjustment tool 664 is attached to the end effecter 20, with the axis of the adjustment tool 664 and the axis of the end effecter 20 in agreement with each other. Next, the adjustment tool 664 and the DBB system 660 are fixed to each other so that the axis of a tip end of the adjustment tool 664 attached to the end effecter 20, and the center of rotation of a movable ball 663 of the DBB system 660 are in agreement with each other.

In the fifth mode, since the DBB system 660 is used, the operator of the machine 1 selects type=5 in Table 1 as the measurement method by manipulating the measurement method selector 131 prior to a calibration. After the selection of type=5, the calculator 113 extracts the error evaluation function corresponding to type=5 from the error evaluation function storage 132, and uses the extracted error evaluation function in calculating kinematic parameters. The indication "off" in the error evaluation function corresponding to type=5 in Table 1 represents an origin offset to be described later. Since the origin offset is unknown at the stage of data acquisition, the calculator 113 calculates the origin offset along with kinematic parameters that minimize the sum of the error evaluation function with respect to acquired data of a required set number.

Next, as shown in FIGS. 11A and 11B, the movable ball 663 to which the adjustment tool 664 is fixed is allowed to roll around the center of the fixed ball 662 in different orientations in a measurable range of the DBB system 660, with a distance between the fixed ball 662 and the movable ball 663, i.e. the radius R being fixed. Hereinafter, the rolling movements of the movable ball 663 is called "spherical movement". It is essentially important to change the orientation of the end effecter 20 while performing the spherical movement of the movable ball 663. In the fifth mode, "setting the adjustment tool 664 in a known posture" means setting the adjustment tool 664 in such a position that enables to acquire necessary data by allowing the spherical movement of the movable ball 663. The range to be measured by the DBB system 660 is a distance obtained by subtracting the origin offset, which is a measurement error, from the radius R that is the distance between the centers of the fixed ball 662 and the movable ball 663.

After the setting of the adjustment tool 664 in the known posture, the data acquirer 114 acquires the strut coordinates s stored in the numerical control device 100. Then, the data acquirer 114 sends, to the calculator 113, the acquired strut coordinates as driver axis coordinates, as well as the center coordinates of the fixed ball 662, the value measured by the DBB system 660, and the measurement method selecting code (type=5) as end effecter posture specifying information. The aforementioned data acquiring process is cyclically repeated by setting the adjustment tool 664 in different posturing positions including the orientation of the end effecter 20, and by setting the DBB system 660 at three or more different sites in total until data of a certain set number sufficient for identifying kinematic parameters are acquired.

X-, Y-, Z-coordinates corresponding to the center of the reference ball 650 are defined as p[1], p[2], and p[3], respectively, and the value measured by the DBB system 660 is defined as p[4].

The distance from the center of the fixed ball 662 to the center of the movable ball 663, which is calculated using the forward kinematics based on the acquired strut coordinates and the kinematic parameters is coincident with the radius R which is the sum of the origin offset of the DBB system 660 and the value measured by the DBB system 660 if the kinematic parameters are accurate and free from mechanical error-causing factors such as gravity deformation or backlash. In other words, a difference between the distance from the point indicated by the center coordinates of the movable ball 663 (corresponding to the tip-end ball of the measurement probe 520 in the second to fourth modes) that are calculated using the forward kinematics based on the strut coordinates stored in the numerical control device 100 to the point indicated by the center coordinates of the fixed ball 662, and the distance represented by the sum of the value measured by the DBB system and the origin offset, is defined as a posturing error. The error evaluation function corresponding to type=5 is defined by the posturing error. The numerical control device 100 calculates kinematic parameters x that minimize the sum of the error evaluation function corresponding to type=5 in Table 1 with respect to all the acquired data, as well as the origin offset, wherein the error evaluation function d expressed as the equation (3) is used as the error evaluation function. With this process, accurate kinematic parameters can be obtained.

Arranging the DBB system 660 at three or more different sites is necessary to completely define a correlation between the reference coordinate system 6 and the kinematic parameters. If data is to be acquired by arranging the DBB system 660 at a single measurement site, data in the rotational axis direction cannot be completely defined for the correlation between the reference coordinate system 6 and the kinematic parameters. With the above measurement approach, innumerable solutions may be obtained, which fails to identify the kinematic parameters. This is because rotating the reference coordinate system 6 around the fixed ball 662 of the DBB system 660 only results in acquisition of the same data. In such a case, normally, the acquired data includes redundant parameters. The same idea is applied to a case where the DBB system 660 is arranged at two measurement sites.

Figure 12:
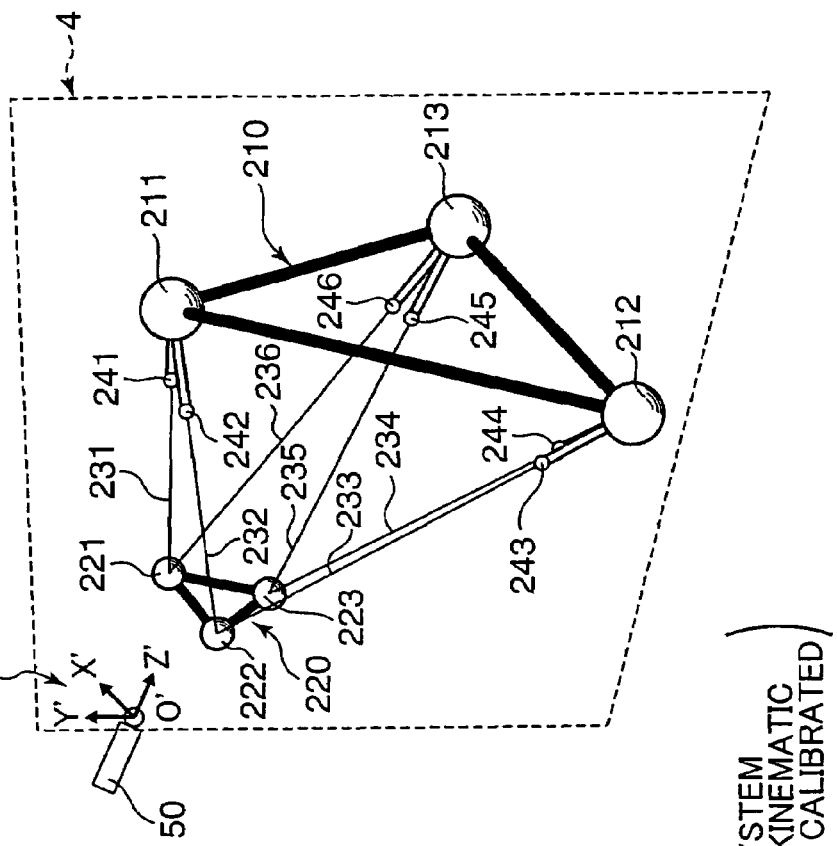
FIG. 12 is a schematic diagram showing a configuration of a 3×3 Stewart platform having 6 degrees of freedom which is adoptable in a parallel kinematic machine embodying the invention.

Description on Other Modifications (A) The above embodiment describes the 6×6 parallel kinematic machine tool, which includes the six joints on the end effecter and the six joints on the base. Alternatively, the invention may be applicable to a robot, a manipulator, and a measuring apparatus provided with a parallel kinematic mechanism. Further alternatively, the invention may be applicable not only to the 6×6 parallel kinematic machine tool, but also to a 3×3 parallel kinematic machine tool, as shown in FIG. 12, which includes three joints on an end effecter and three joints on a base.

(B) In the foregoing embodiment, the Stewart platform is described as an example of the machines which have straight driving shafts or struts expandable or contractible to control the position and the orientation of the end effecter. However, the invention is not limited to the embodiment, but is applicable to a parallel kinematic machine of rotary type, wherein plural driver shafts are connected to each other by joints, and the position and the orientation of an end effecter are controlled by controlling the angle of the joint connected to each driver shaft or the rotation angle of each driver shaft, or to a parallel kinematic machine of direct driving type, wherein a driver shaft has one end thereof connected to an end effecter, and the other end thereof being directly driven by a slider along rails to control the position and the orientation of the end effecter. Further alternatively, the invention is applicable to any parallel kinematic machine which is controlled in accordance with nonlinear simultaneous equations which define forward kinematics and inverse kinematics, even if the machine has freedom of degrees lower than six degrees.

(C) The foregoing embodiment describes the case that the reference surface 5 of the work holder 3 or the reference board 60 is parallel to the XY-plane of the reference coordinate system 6. Alternatively, the reference coordinate system 6 may be defined at any angle relative to the reference surface 5 of the reference board 60.

Figure 13A:
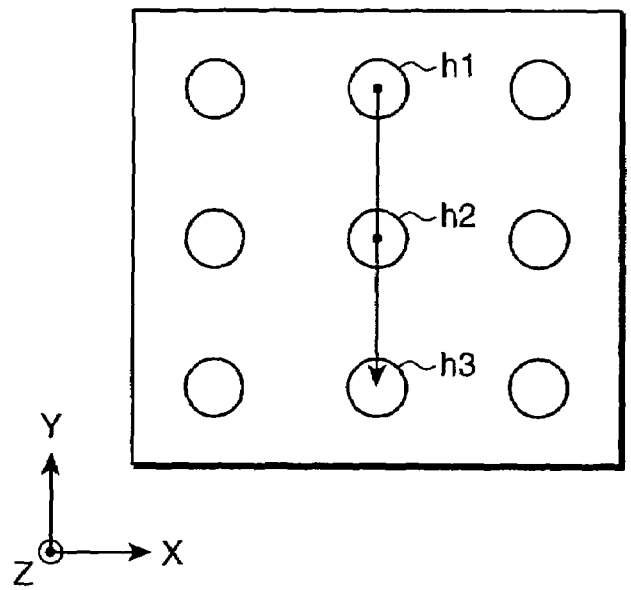
Figure 13B:
Figure 13C:
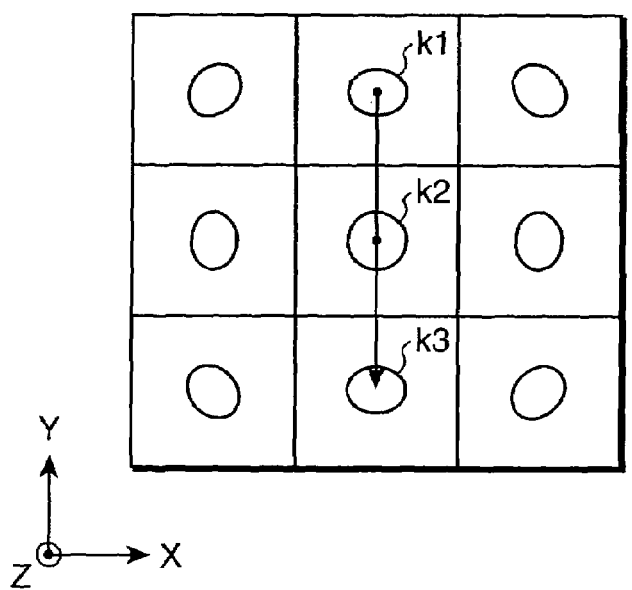
Figure 13D:
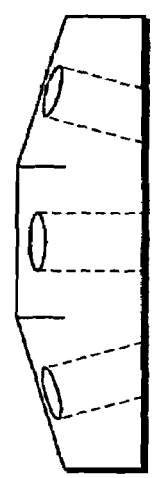

(D) The first mode describes the case that the reference holes 71 are formed in the reference hole upper surface 75 flush with the upper surface 73 of the jig plate 70, and the upper surface 73 is parallel to the XY-plane of the reference coordinate system 6. Alternatively, a tilt jig plate having a tilt reference hole upper surface 75 with a known tilt angle may be formed with reference holes 71, and posturing of the end effecter may be performed relative to the tilt jig plate. FIGS. 13A to 13D are illustrations showing a flat jig plate and a tilt jig plate, wherein FIG. 13A is a diagram of the flat jig plate viewed from an end effecter 20, FIG. 13B is a side view of FIG. 13A, FIG. 13C is a diagram of the tilt jig plate viewed from the end effecter 20, and FIG. 13D is a side view of FIG. 13C.

With use of the flat jig plate, merely orientation angles with respect to the A- and B-axes are defined with respect to a reference orientation i.e. 0 degree. In the case where a parallel kinematic machine including the joints in the base and the joints in the end effecter in a relation close to a parallel position is used, even if data of a large set number are acquired, a relational expression defined by the acquired data is only a linearly dependent equation. Accordingly, the total kinematic parameters cannot be accurately identified. In view of this, the first mode uses the arrangement that the position coordinates of the joints in the end effecter are obtained in advance with use of the three-dimensional measuring apparatus, and other kinematic parameters are calculated with use of the measurement data.

On the other hand, with use of the tilt jig plate, data including different orientation coordinates (A, B) of the end effecter 20 can be obtained by using the reference holes formed in the reference hole upper plate whose tilt angle is variable. In this modification, setting of the end effecter 20 in the reference orientation i.e. setting of the C-axis cannot be made because a leveler is not used. However, kinematic parameters can be identified by using an error evaluation coefficient, without considering the reference orientation of the end effecter 20 i.e. the C-axis. In the modification, relational expressions that are independent of each other can be obtained easily based on the data obtained by setting the end effecter 20 in different orientation angles. Accordingly, the total kinematic parameters including the positions of the joints in the end effecter can be accurately identified.

(E) The first mode and the modification (D) describe the data acquiring approach, wherein at least the position coordinates of the end effecter 20 with respect to the X-, Y, and Z-axes, and the orientation coordinates of the end effecter 20 with respect to the A- and B-axes in the reference coordinate system 6 are simultaneously obtained with use of the reference holes and the reference hole upper surface. The above approach requires the reference jig including the finely machined or processed reference upper surface, and the reference holes having the cylindrical inner wall extending orthogonal to the upper surface along the axis of the reference hole. Alternatively, position coordinates and orientation coordinates of the end effecter in the reference coordinate system 6 may be obtained individually with respect to the axes. In other words, it is possible to acquire orientation coordinates of the end effecter in the reference coordinate system 6 independently of position coordinates thereof in acquiring coordinate data in the first mode.

The above modification shows that it is possible to acquire data that only defines the orientation coordinate of the end effecter in the reference coordinate system 6, with use of a reference jig having a reference flat surface without a hole, and a dial gauge. In the modification, the reference jig, in which X-, Y-, Z-position coordinates are approximately defined, and the tilt angle of the end effecter is accurately defined, is used. Data is acquired by adjusting the A- and B-axes, with the axis of the adjustment tool perpendicularly intersecting the reference flat surface of the reference jig. Then, the A- and B-axes which are determined by the tilt of the reference surface are defined by setting the error evaluation coefficient with respect to the X-, Y-, Z-, A-, B-, and C-axes to (0, 0, 0, 1, 1, 0) for instance. In other words, in the modification, the X-, Y, -Z, and C-axes are not defined or considered. The data which merely defines the A- and B-axes is particularly advantageous in use with data acquired by the data acquiring processes in the other modes.

For instance, the total kinematic parameters including the positions of the joints in the end effecter can be identified by using the data acquired by the data acquiring process in the modification along with the data acquired by the data acquiring process in the first mode. There is a case that a posturing error concerning the position or the orientation of the end effecter may remain due to a mechanical error-causing factor such as gravity deformation in the case where kinematic parameters are obtained based on the acquired data in the aforementioned modes. In order to approximate an orientation error at least concerning the reference orientation of the end effecter to zero, data is acquired for the end effecter in an orientation near the reference orientation, and a large error evaluation coefficient e.g. (0, 0, 0, 1000, 1000, 0) is added to the acquired data to thereby obtain kinematic parameters that accurately define the orientation angle of the end effecter in the reference orientation.

(F) In the second to fourth modes, automatic measurement with use of the measurement probe as the adjustment tool 50 is described. Alternatively, manual measurement with use of a ball bar is particularly effective in identifying initial kinematic parameters with less reliability. Even if kinematic parameters have a measurement error in the order of e.g. several hundred millimeters, position coordinates and orientation coordinates of the end effecter can be acquired by performing posturing of the end effecter by operating the manual handle, which enables to accurately identify the kinematic parameters.

(G) The data acquiring processes in the first to fifth modes may be combined with each other. There is a spatial area where position coordinates cannot be obtained according to an ordinary data acquiring approach. The third mode is effective in acquiring data in such a spatial area. Specifically, in the second mode, the rectangular parallelepiped block is disposed at a position where reduction of the dimensions of the spatial area is required. Acquiring data such as position coordinates with respect to the block as a reference object to be measured enables to identify kinematic parameters, considering an absolute posturing error. Further alternatively, a finely machined or processed reference groove is formed in a work holder 3 or a reference board 60, and the data acquiring process in the second mode is performed for a side wall of the reference groove, as a reference flat surface of a reference object. This modification enables to obtain kinematic parameters, considering absolute posturing information concerning the posturing of the end effecter in a large work area. In case of using the various modes in combination, data sufficient to identify kinematic parameters with use of the entirety of the acquired data is acquired.

(H) In the foregoing modes, the reference object is accurately disposed at the known position in the reference coordinate system 6. Alternatively, the reference object may not be disposed accurately. If the reference object is disposed at an approximate position, it is possible to identify the disposed position as an unknown, as well as kinematic parameters, although the modification may increase the data set number to be acquired. In the fifth mode, it is required to acquire data by disposing the DBB system at least at three different positions. If the data acquisition is performed along with the other mode(s), it is possible to acquire data by disposing the DBB system at a single position. For instance, a DBB system is disposed at an approximate position, and three or more sets of data obtained by the data acquiring process in the first mode is additionally used. The modification enables to identify kinematic parameters, considering a roundness error by identifying the disposed position of the DBB system as an unknown, as well as the kinematic parameters.

(I) The aforementioned posturing techniques are merely some of the examples. As long as data necessary for identifying kinematic parameters can be acquired, any posturing technique other than the aforementioned posturing techniques can be used. For instance, in the first mode, a tracer head provided with a stylus whose radius is known, or a laser range meter may be used. In the foregoing modes, posturing of the end effecter is performed by the measurement method individually set in the respective modes. Alternatively, several posturing techniques may be used in combination. In the modification, kinematic parameters can be calculated by using an error evaluation function individually set in accordance with the form of the acquired data.

In general, the routines executed to implement the embodiment of the invention, whether implemented as part of an operating system or a specific application, component, program, object, module or sequence of instructions will be referred to as "programs". The program comprises one or more instructions that are resident at various times in various memories and storage devices in a computer, and that cause the computer to perform the steps necessary to execute steps or elements embodying the various aspects of the invention.

The embodiment of the invention has been and will be described in the context of functioning the computer and computer system. However, those skilled in the art will appreciate that various embodiments of the invention are capable of being distributed as a program product in a variety of forms, and that the invention is applied equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

As described above, a novel parallel kinematic machine comprises: a parallel kinematic mechanism including a base supported on a support platform, an end effecter, and a parallel link mechanism having a plurality of driver shafts for holding the end effecter in the base; a numerical control device for controlling a position and an orientation of the end effecter by driving the driver shafts based on kinematics of the parallel kinematic mechanism; a posture setter for setting an adjustment tool attached to the end effecter in a known posture in a reference coordinate system defined outside of the parallel kinematic mechanism based on a predetermined measurement method, an axis of the end effecter and an axis of the adjustment tool being in agreement with each other; a data acquirer for acquiring data that has a form in accordance with a measurement method selecting code for designating the measurement method used by the posture setter in setting the adjustment tool in the known posture, and defines a correlation between kinematic parameters necessary for the kinematics of the parallel kinematic mechanism, and the reference coordinate system; and a calculator for calculating at least the kinematic parameters based on the acquired data by directly using a relational expression describing forward kinematics of the parallel kinematic mechanism.

The parallel kinematic machine may be preferably provided with a measurement method selector for selecting the measurement method selecting code; and an error evaluation function storage for storing therein at least one error evaluation function which is designated by the measurement method selecting code selected by the measurement method selector to evaluate the acquired data, the error evaluation function being a relational expression describing the forward kinematics of the parallel kinematic mechanism. The calculator extracts the error evaluation function designated by the measurement method selecting code among the error evaluation functions stored in the error evaluation function storage, and uses the extracted error evaluation function to calculate the kinematic parameters that minimize the sum of the error evaluation function with respect to a certain number of data sets sufficient for identifying the kinematic parameters.

The calculator may preferably obtain a solution of a nonlinear simultaneous equation using an asymptotic method, as the kinematic parameters to be calculated, using the kinematic parameter that is given to the calculator for the first time as an initial value, the solution of the nonlinear simultaneous equation being obtained by calculating the sum of the error evaluation function with respect to the number of data sets sufficient for identifying the kinematic parameters, performing partial differentiation of the sum using the respective kinematic parameters, and by setting the result of the partial differentiation to zero.

The data acquirer may preferably acquire, as the data to be acquired, end effecter posture specifying information for defining at least a part of the position and the orientation of the end effecter in the reference coordinate system, and driver shaft coordinates for defining a correlation between a posture of the end effecter defined by setting the adjustment tool in the known posture, and the kinematic parameters.

Preferably, the adjustment tool may include a position coordinate adjuster and an orientation coordinate adjuster, and the posture setter may be defined at a predetermined position in the reference coordinate system. The posture setter may fix position coordinates of the end effecter by setting the adjustment tool at such a position that enables to specify position coordinates of the adjustment tool in the reference coordinate system based on a reference flat surface perpendicularly intersecting an axis of a reference hole, the reference hole having an inner wall extending in a direction of the axis of the reference hole, and a measurement value obtained by the coordinate adjuster. The posture setter may fix two orientation coordinates of the end effecter by rotating the orientation adjuster about the axis of the adjustment tool to such an orientation that enables to specify the two orientation coordinates of the end effecter in the reference coordinate system based on a correlation between a rotary plane of the orientation adjuster and the reference flat surface, the two orientation coordinates representing tilts of the end effecter with respect to the axis of the end effecter, respectively. The data acquirer may acquire, as the end effecter posture specifying information, the position coordinates and the two orientation coordinates of the end effecter in the reference coordinate system by setting the adjustment tool in the known posture in the reference coordinate system.

The error evaluation function may be preferably defined by a posturing error corresponding to a difference between at least a part of the position coordinates and the orientation coordinates of the end effecter in the reference coordinate system, the position coordinates and the orientation coordinates constituting the end effecter posture specifying information, and at least a part of the position coordinates and the orientation coordinates of the end effecter which are calculated using the forward kinematics based on the driver shaft coordinates in a coordinate system of the end effecter, the posturing error being a difference in the counterpart coordinates between the reference coordinate system and the end effecter coordinate system.

The error evaluation function may be preferably multiplied by a predetermined error evaluation coefficient with respect to each of the coordinates to define the posturing error.

Preferably, the adjustment tool may include a spherical probe, at least a radius of a ball at a tip end of the spherical probe, and a length of the spherical probe being known. The posture setter may set the adjustment tool in the known posture by contacting the spherical probe with a reference object whose position coordinates and configuration specifying information are known in the reference coordinate system. The data acquirer may acquire the position coordinates and the configuration specifying information of the reference object as the end effecter posture specifying information. The error evaluation function may be defined by a posturing error corresponding to a difference between a surface of the reference object which is defined based on the position coordinates and the configuration specifying information of the reference object, and an imaginary ball which has a center corresponding to center coordinates of the ball at the tip end of the spherical probe calculated using the forward kinematics based on the driver shaft coordinates, and has a radius corresponding to the radius of the ball at the tip end of the spherical probe.

Preferably, the posture setter may set a tip end of the adjustment tool within a measurable range of a range meter disposed at a predetermined position in the reference coordinate system, the range meter having a fixed ball whose position coordinates at a center thereof are known in the reference coordinate system, and a movable ball having a center thereof in agreement with a center of the tip end of the adjustment tool. The data acquirer may acquire, as the end effecter posture specifying information, a distance obtained by subtracting an origin offset, which is a measurement error, from a distance between the center of the movable ball and the center of the fixed ball as well as the position coordinates at the center of the fixed ball, the distance being a value measured by the range meter.

Preferably, the error evaluation function may be defined by a posturing error corresponding to a difference between a distance from a point indicated by position coordinates at the center of the tip end of the adjustment tool which are calculated using the forward kinematics based on the driver shaft coordinates, to a point indicated by the position coordinates at the center of the fixed ball of the range meter, and a distance represented by the sum of the value measured by the range meter, and the origin offset. The calculator may calculate the origin offset which is necessary for calculating the posturing error in the error evaluation function, in addition to the kinematic parameters.

The driver shaft coordinates may be preferably stored in the numerical control device.

Preferably, the driver shaft coordinates may include an orientation command stored in the numerical control device. The calculator may convert the orientation command into a driver shaft coordinate using inverse kinematics based on the kinematic parameters set in the numerical control device, and then, calculate at least the kinematic parameters using the driver shaft coordinate.

Also, a novel method is adapted for calibrating a parallel kinematic machine provided with: a parallel kinematic mechanism including a base supported on a support platform, an end effecter, and a parallel link mechanism having a plurality of driver shafts for holding the end effecter in the base; and a numerical control device for controlling a position and an orientation of the end effecter by driving the driver shafts based on kinematics of the parallel kinematic mechanism. The method comprises: setting an adjustment tool attached to the end effecter in a known posture in a reference coordinate system defined outside of the parallel kinematic mechanism based on a predetermined measurement method, an axis of the end effecter and an axis of the adjustment tool being in agreement with each other; acquiring data that has a form in accordance with a measurement method selecting code for designating the measurement method used by the posture setter in setting the adjustment tool in the known posture, and defines a correlation between kinematic parameters necessary for the kinematics of the parallel kinematic mechanism, and the reference coordinate system; and calculating at least the kinematic parameters based on the acquired data by directly using a relational expression describing forward kinematics of the parallel kinematic mechanism.

Further, a novel program product is adapted for performing a calibration of a parallel kinematic machine provided with a parallel kinematic mechanism including a base supported on a support platform, an end effecter, and a parallel link mechanism having a plurality of driver shafts for holding the end effecter in the base; and a numerical control device for controlling a position and an orientation of the end effecter by driving the driver shafts based on kinematics of the parallel kinematic mechanism. The program product comprises a program configured to: set an adjustment tool attached to the end effecter in a known posture in a reference coordinate system defined outside of the parallel kinematic mechanism based on a predetermined measurement method, an axis of the end effecter and an axis of the adjustment tool being in agreement with each other; acquire data that has a form in accordance with a measurement method selecting code for designating the measurement method used in setting the adjustment tool in the known posture, and defines a correlation between kinematic parameters necessary for the kinematics of the parallel kinematic mechanism, and the reference coordinate system; and calculate at least the kinematic parameters based on the acquired data by directly using a relational expression describing forward kinematics of the parallel kinematic mechanism; and a signal bearing media bearing the program.

With the novel machine, method, and program product, data defining an absolute posture of the end effecter in the reference coordinate system can be easily acquired because the adjustment tool is set in the known posture for measurement. Also, numerical errors can be effectively suppressed to accurately identify all the kinematic parameters by directly using the basic kinematics equations.

This application is based on Japanese Patent Application No. 2005-302105 and No. 2005-322294 filed on Oct. 17, 2005 and Nov. 7, 2005, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A parallel kinematic machine comprising:
  a parallel kinematic mechanism including
    a base supported on a support platform,
    a parallel link mechanism having a plurality of driver shafts for holding the end effecter in the base;
  a numerical control device for controlling a position and an orientation of the end effecter by driving the driver shafts based on kinematics of the parallel kinematic mechanism;
  a posture setter for setting an adjustment tool attached to the end effecter in a known posture in a reference coordinate system defined outside of the parallel kinematic mechanism based on a predetermined measurement method, an axis of the end effecter and an axis of the adjustment tool being in agreement with each other;
  a data acquirer for acquiring data that has a form in accordance with a measurement method selecting code for designating the measurement method used by the posture setter in setting the adjustment tool in the known posture, and defines a correlation between kinematic parameters necessary for the kinematics of the parallel kinematic mechanism, and the reference coordinate system;
  a calculator for calculating at least the kinematic parameters based on the acquired data by directly using a relational expression describing forward kinematics of the parallel kinematic mechanism;
  a measurement method selector for selecting the measurement method selecting code; and an error evaluation function storage for storing therein at least one error evaluation function which is designated by the measurement method selecting code selected by the measurement method selector to evaluate the acquired data, the error evaluation function being a relational expression describing the forward kinematics of the parallel kinematic mechanism, wherein the calculator extracts the error evaluation function designated by the measurement method selecting code among the error evaluation functions stored in the error evaluation function storage, and uses the extracted error evaluation function to calculate the kinematic parameters that minimize the sum of the error evaluation function with respect to a certain number of data sets sufficient for identifying the kinematic parameters.

2. The parallel kinematic machine according to claim 1, wherein the calculator obtains a solution of a nonlinear simultaneous equation using an asymptotic method, as the kinematic parameters to be calculated, using the kinematic parameter that is given to the calculator for the first time as an initial value, the solution of the nonlinear simultaneous equation being obtained by calculating the sum of the error evaluation function with respect to the number of data sets sufficient for identifying the kinematic parameters, performing partial differentiation of the sum using the respective kinematic parameters, and by setting the result of the partial differentiation to zero.

3. The parallel kinematic machine according to claim 2, wherein the data acquirer acquires, as the data to be acquired, end effecter posture specifying information for defining at least a part of the position and the orientation of the end effecter in the reference coordinate system, and driver shaft coordinates for defining a correlation between a posture of the end effecter defined by selling the adjustment tool in the known posture, and the kinematic parameters.

4. The parallel kinematic machine according to claim 3, wherein the adjustment tool includes a position coordinate adjuster and an orientation coordinate adjuster, the posture seller is defined at a predetermined position in the reference coordinate system, the posture seller fixes position coordinates of the end effecter by selling the adjustment tool at such a position that enables to specify position coordinates of the adjustment tool in the reference coordinate system based on a reference flat surface perpendicularly intersecting an axis of a reference hole, the reference hole having an inner wall extending in a direction of the axis of the reference hole, and a measurement value obtained by the coordinate adjuster, the posture seller fixes two orientation coordinates of the end effecter by rotating the orientation adjuster about the axis of the adjustment tool to such an orientation that enables to specify the two orientation coordinates of the end effecter in the reference coordinate system based on a correlation between a rotary plane of the orientation adjuster and the reference flat surface, the two orientation coordinates representing tilts of the end effecter with respect to the axis of the end effecter, respectively, and the data acquirer acquires, as the end effecter posture specifying information, the position coordinates and the two orientation coordinates of the end effecter in the reference coordinate system by selling the adjustment tool in the known posture in the reference coordinate system.

5. The parallel kinematic machine according to claim 4, wherein the error evaluation function is defined by a posturing error corresponding to a difference between at least a part of the position coordinates and the orientation coordinates of the end effecter in the reference coordinate system, the position coordinates and the orientation coordinates constituting the end effecter posture specifying information, and at least a part of the position coordinates and the orientation coordinates of the end effecter which are calculated using the forward kinematics based on the driver shaft coordinates in a coordinate system of the end effecter, the posturing error being a difference in the counterpart coordinates between the reference coordinate system and the end effecter coordinate system.

6. The parallel kinematic machine according to claim 5, wherein the error evaluation function is multiplied by a predetermined error evaluation coefficient with respect to each of the coordinates to define the posturing error.

7. The parallel kinematic machine according to claim 3, wherein the adjustment tool includes a spherical probe, at least a radius of a ball at a tip end of the spherical probe, and a length of the spherical probe being known, the posture setter sets the adjustment tool in the known posture by contacting the spherical probe with a reference object whose position coordinates and configuration specifying information are known in the reference coordinate system, the data acquirer acquires the position coordinates and the configuration specifying information of the reference object as the end effecter posture specifying information, and the error evaluation function is defined by a posturing error corresponding to a difference between a surface of the reference object which is defined based on the position coordinates and the configuration specifying information of the reference object, and an imaginary ball which has a center corresponding to center coordinates of the ball at the tip end of the spherical probe calculated using the forward kinematics based on the driver shaft coordinates, and has a radius corresponding to the radius of the ball at the tip end of the spherical probe.

8. The parallel kinematic machine according to claim 3, wherein the posture setter sets a tip end of the adjustment tool within a measurable range of a range meter disposed at a predetermined position in the reference coordinate system, the range meter having a fixed ball whose position coordinates at a center thereof are known in the reference coordinate system, and a movable ball having a center thereof in agreement with a center of the tip end of the adjustment tool, and the data acquirer acquires, as the end effecter posture specifying information, a distance obtained by subtracting an origin offset, which is a measurement error, from a distance between the center of the movable ball and the center of the fixed ball, as well as the position coordinates at the center of the fixed ball, the distance being a value measured by the range meter.

9. The parallel kinematic machine according to claim 8, wherein the error evaluation function is defined by a posturing error corresponding to a difference between a distance from a point indicated by position coordinates at the center of the tip end of the adjustment tool which are calculated using the forward kinematics based on the driver shaft coordinates, to a point indicated by the position coordinates at the center of the fixed ball of the range meter, and a distance represented by the sum of the value measured by the range meter, and the origin offset, and the calculator calculates the origin offset which is necessary for calculating the posturing error in the error evaluation function, in addition to the kinematic parameters.

10. The parallel kinematic machine according to claim 9, wherein the driver shaft coordinates are stored in the numerical control device.

11. The parallel kinematic machine according to claim 9, wherein the driver shaft coordinates include an orientation command stored in the numerical control device, and
the calculator converts the orientation command into a driver shaft coordinate using inverse kinematics based on the kinematic parameters set in the numerical control device, and then, calculates at least the kinematic parameters using the driver shaft coordinate.

12. The parallel kinematic machine according to claim 3, wherein the driver shaft coordinates are stored in the numerical control device.

13. The parallel kinematic machine according to claim 3, wherein the driver shaft coordinates include an orientation command stored in the numerical control device, and
the calculator converts the orientation command into a driver shaft coordinate using inverse kinematics based on the kinematic parameters set in the numerical control device, and then, calculates at least the kinematic parameters using the driver shaft coordinate.

14. A parallel kinematic machine comprising:
a parallel kinematic mechanism including
a base supported on a support platform,
an end effecter, and
a parallel link mechanism having a plurality of driver shafts for holding the end effecter in the base;
a numerical control device for controlling a position and an orientation of the end effecter by driving the driver shafts based on kinematics of the parallel kinematic mechanism;
a posture setter for setting an adjustment tool attached to the end effecter in a known posture in a reference coordinate system defined outside of the parallel kinematic mechanism based on a predetermined measurement method, an axis of the end effecter and an axis of the adjustment tool being in agreement with each other;
a data acquirer for acquiring data that has a form in accordance with a measurement method selecting code for designating the measurement method used by the posture setter in setting the adjustment tool in the known posture, and defines a correlation between kinematic parameters necessary for the kinematics of the parallel kinematic mechanism, and the reference coordinate system;
a calculator for calculating at least the kinematic parameters based on the acquired data by directly using a relational expression describing forward kinematics of the parallel kinematic mechanism;
wherein the data acquirer acquires, as the data to be acquired, end effecter posture specifying information for defining at least a part of the position and the orientation of the end effecter in the reference coordinate system, and driver shaft coordinates for defining a correlation between a posture of the end effecter defined by setting the adjustment tool in the known posture, and the kinematic parameters.

15. A method for calibrating a parallel kinematic machine provided with: a parallel kinematic mechanism including a base supported on a support platform, an end effecter, and a parallel link mechanism having a plurality of driver shafts for holding the end effecter in the base; and a numerical control device for controlling a position and an orientation of the end effecter by driving the driver shafts based on kinematics of the parallel kinematic mechanism, the method comprising:

setting an adjustment tool attached to the end effecter in a known posture in a reference coordinate system defined outside of the parallel kinematic mechanism based on a predetermined measurement method, an axis of the end effecter and an axis of the adjustment tool being in agreement with each other;
acquiring data that has a form in accordance with a measurement method selecting code for designating the measurement method used in setting the adjustment tool in the known posture, and defines a correlation between kinematic parameters necessary for the kinematics of the parallel kinematic mechanism, and the reference coordinate system;
selecting the measurement method selecting code;
storing at least one error evaluation function which is designated by the selected measurement method selecting code to evaluate the acquired data, the error evaluation function being a relational expression describing the forward kinematics of the parallel kinematic mechanism;
extracting the error evaluation function designated by the measurement method selecting code among the stored error evaluation functions; and
calculating kinematic parameters that minimize the sum of the error evaluation function with respect to a certain number of data sets sufficient for identifying the kinematic parameters using the extracted error evaluation function.

16. A computer-recordable medium storing a program for performing a calibration of a parallel kinematic machine provided with a parallel kinematic mechanism including a base supported on a support platform, an end effecter, and a parallel link mechanism having a plurality of driver shafts for holding the end effecter in the base; and a numerical control device for controlling a position and an orientation of the end effecter by driving the driver shafts based on kinematics of the parallel kinematic mechanism, the program is configured to:
allow an adjustment tool attached to the end effecter to be set in a known posture in a reference coordinate system defined outside of the parallel kinematic mechanism based on a predetermined measurement method, an axis of the end effecter and an axis of the adjustment tool being in agreement with each other;
acquire data that has a form in accordance with a measurement method selecting code for designating the measurement method used in setting the adjustment tool in the known posture, and defines a correlation between kinematic parameters necessary for the kinematics of the parallel kinematic mechanism, and the reference coordinate system;
select the measurement method selecting code;
store at least one error evaluation function which is designated by the selected measurement method selecting code to evaluate the acquired data, the error evaluation function being a relational expression describing the forward kinematics of the parallel kinematic mechanism;
extract the error evaluation function designated by the measurement method selecting code among the stored error evaluation functions; and
calculate kinematic parameters that minimize the sum of the error evaluation function with respect to a certain number of data sets sufficient for identifying the kinematic parameters using the extracted error evaluation function.

* * * * *